(12) United States Patent
Tsuchita et al.

(10) Patent No.: US 9,350,962 B2
(45) Date of Patent: May 24, 2016

(54) IMAGE PROCESSING DEVICE, IMAGING APPARATUS, COMPUTER, IMAGE PROCESSING METHOD, AND NON-TRANSITORY COMPUTER READABLE MEDIUM

(71) Applicant: FUJIFILM Corporation, Tokyo (JP)

(72) Inventors: Akiyoshi Tsuchita, Saitama (JP); Kenkichi Hayashi, Saitama (JP); Takeshi Misawa, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/627,233

(22) Filed: Feb. 20, 2015

(65) Prior Publication Data

US 2015/0172614 A1 Jun. 18, 2015

Related U.S. Application Data

(63) Continuation of application No. PCT/JP2013/061876, filed on Apr. 23, 2013.

(30) Foreign Application Priority Data

Aug. 23, 2012 (JP) ................................. 2012-183984

(51) Int. Cl.
*H04N 9/64* (2006.01)
*G06T 3/40* (2006.01)
(Continued)

(52) U.S. Cl.
CPC ........ *H04N 9/646* (2013.01); *G06T 3/40* (2013.01); *G06T 3/4015* (2013.01); *H04N 5/23296* (2013.01); *H04N 5/357* (2013.01); *H04N 9/045* (2013.01)

(58) Field of Classification Search
None
See application file for complete search history.

(56) References Cited

U.S. PATENT DOCUMENTS

| 5,418,899 | A | | 5/1995 | Aoki et al. |
| 5,917,963 | A | * | 6/1999 | Miyake ................. G06T 3/4007 358/3.07 |

(Continued)

FOREIGN PATENT DOCUMENTS

| JP | 5-328106 A | 12/1993 |
| JP | 2000-188689 A | 7/2000 |

(Continued)

OTHER PUBLICATIONS

International Search Report issued in PCT/JP2013/061876, mailed on May 21, 2013.

(Continued)

*Primary Examiner* — Michael Osinski
(74) *Attorney, Agent, or Firm* — Birch, Stewart, Kolasch & Birch, LLP

(57) ABSTRACT

An image enlargement processing portion 16 of the image processing device includes a data acquisition section 70 which judges whether or not photographing condition data is included in the image photographing data, and for acquiring content of the photographing condition data in a case where it is judged that the photographing condition data is included in the input image photographing data, and an enlargement process determination section 72 which determines a process parameter for an enlargement process for generating enlarged image data from the imaging data, in which the photographing condition data includes information regarding presence or absence of an optical low-pass filter during creation of the imaging data or information regarding an array of color filters of an imaging portion used to create the imaging data.

21 Claims, 24 Drawing Sheets

(51) Int. Cl.
    *H04N 5/232*     (2006.01)
    *H04N 9/04*     (2006.01)
    *H04N 5/357*     (2011.01)

(56) References Cited

U.S. PATENT DOCUMENTS

| | | | | |
|---|---|---|---|---|
| 6,768,514 | B1* | 7/2004 | Tsuchiya | H04N 5/20 348/252 |
| 7,362,897 | B2* | 4/2008 | Ishiga | G06T 3/4007 348/246 |
| 7,548,264 | B2* | 6/2009 | Mitsunaga | H04N 9/045 348/272 |
| 7,889,252 | B2* | 2/2011 | Tamura | G06T 3/4015 348/272 |
| 8,208,039 | B2* | 6/2012 | Manabe | G06T 5/009 348/229.1 |
| 8,213,736 | B2* | 7/2012 | Toyoda | G06T 5/20 382/254 |
| 8,369,624 | B2* | 2/2013 | Gomi | G06T 3/4007 382/190 |
| 8,462,237 | B2* | 6/2013 | Egawa | H04N 5/2257 348/222.1 |
| 8,478,063 | B2* | 7/2013 | Toyoda | G06T 5/20 382/167 |
| 8,797,421 | B2* | 8/2014 | Atanassov | G06T 5/50 348/208.14 |
| 8,948,506 | B2* | 2/2015 | Saito | H04N 9/045 382/162 |
| 9,113,059 | B2* | 8/2015 | Ikeda | H04N 5/225 |
| 9,172,852 | B2* | 10/2015 | Endo | H04N 5/225 |
| 2002/0006230 | A1* | 1/2002 | Enomoto | G06T 5/009 382/261 |
| 2002/0076121 | A1* | 6/2002 | Shimizu | G06T 3/403 382/300 |
| 2002/0118019 | A1 | 8/2002 | Nomura | |
| 2003/0016306 | A1* | 1/2003 | Ogata | G06T 5/007 348/671 |
| 2004/0174444 | A1* | 9/2004 | Ishii | H04N 5/232 348/240.1 |
| 2006/0251335 | A1* | 11/2006 | Sugimoto | H04N 1/409 382/275 |
| 2008/0012969 | A1* | 1/2008 | Kasai | H04N 5/23232 348/266 |
| 2008/0030603 | A1* | 2/2008 | Masuno | H04N 9/045 348/273 |
| 2008/0291312 | A1* | 11/2008 | Egawa | H04N 9/045 348/308 |
| 2009/0284610 | A1* | 11/2009 | Fukumoto | H04N 5/23232 348/208.99 |
| 2009/0310880 | A1* | 12/2009 | Yokoyama | H04N 5/142 382/260 |
| 2010/0150440 | A1* | 6/2010 | Kwak | H04N 9/045 382/167 |
| 2010/0271498 | A1* | 10/2010 | Hwang | G06T 5/50 348/222.1 |
| 2011/0080505 | A1* | 4/2011 | Ogino | H04N 5/365 348/246 |
| 2011/0150349 | A1* | 6/2011 | Kojima | G06K 9/00228 382/224 |
| 2011/0273531 | A1* | 11/2011 | Ito | H04N 13/026 348/43 |
| 2013/0100263 | A1* | 4/2013 | Tsuda | G06T 5/002 348/65 |
| 2013/0286172 | A1* | 10/2013 | Sasaki | A61B 1/0009 348/65 |
| 2014/0028864 | A1* | 1/2014 | Tsubusaki | H04N 5/23245 348/208.12 |
| 2015/0098499 | A1* | 4/2015 | Tominaga | H04N 5/23229 375/240.02 |
| 2015/0146049 | A1* | 5/2015 | Tsuchita | H04N 5/23235 348/242 |
| 2015/0172614 | A1* | 6/2015 | Tsuchita | G06T 3/4015 348/242 |

FOREIGN PATENT DOCUMENTS

| | | |
|---|---|---|
| JP | 2000-268168 A | 9/2000 |
| JP | 2002-262094 A | 9/2002 |
| JP | 2002-369036 A | 12/2002 |
| JP | 2003-61034 A | 2/2003 |
| JP | 2005-56006 A | 3/2005 |

OTHER PUBLICATIONS

PCT/ISA/237—Issued in PCT/JP2013/061876, mailed on May 21, 2013.

Written Opinion of the International Preliminary Examination Authority issued in PCT/JP2013/061876, dated Dec. 2, 2014.

\* cited by examiner

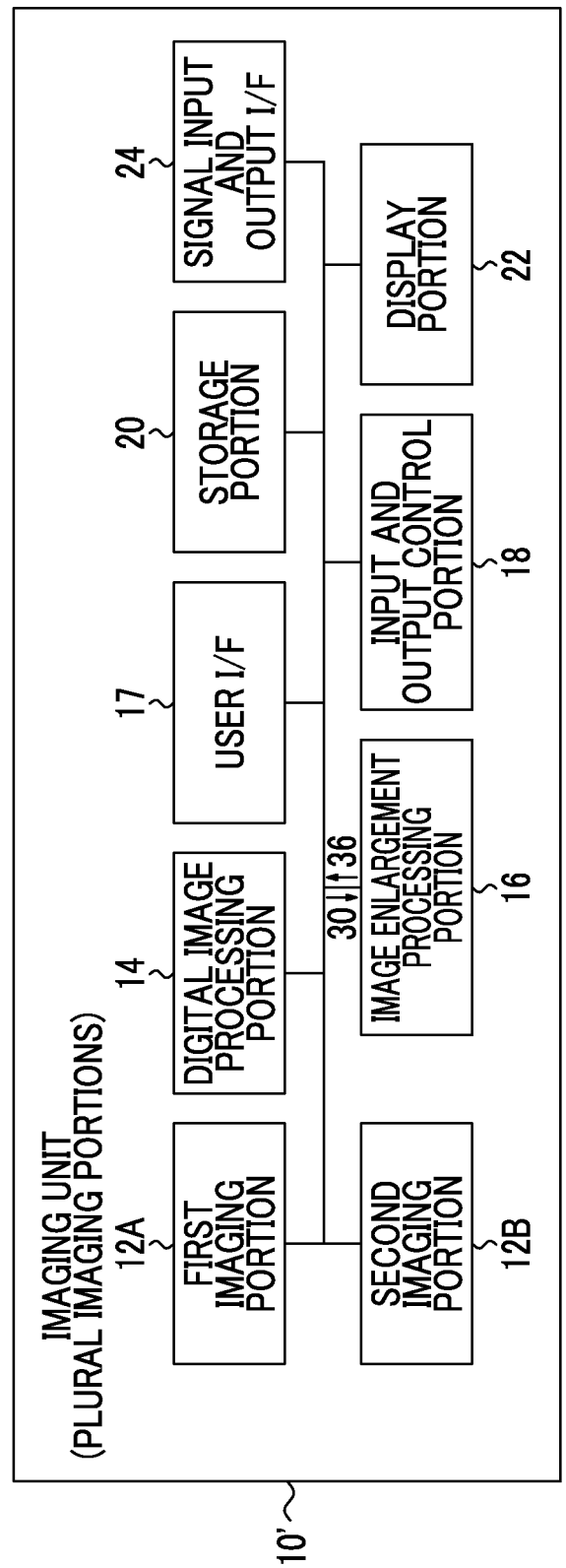

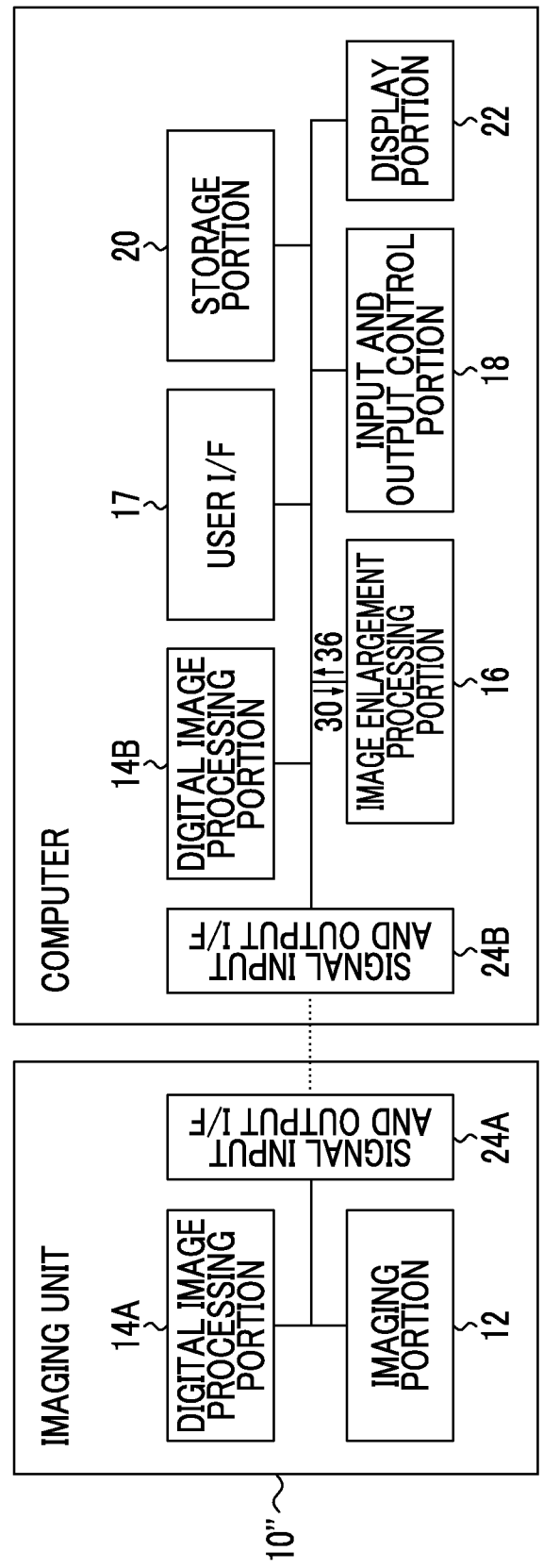

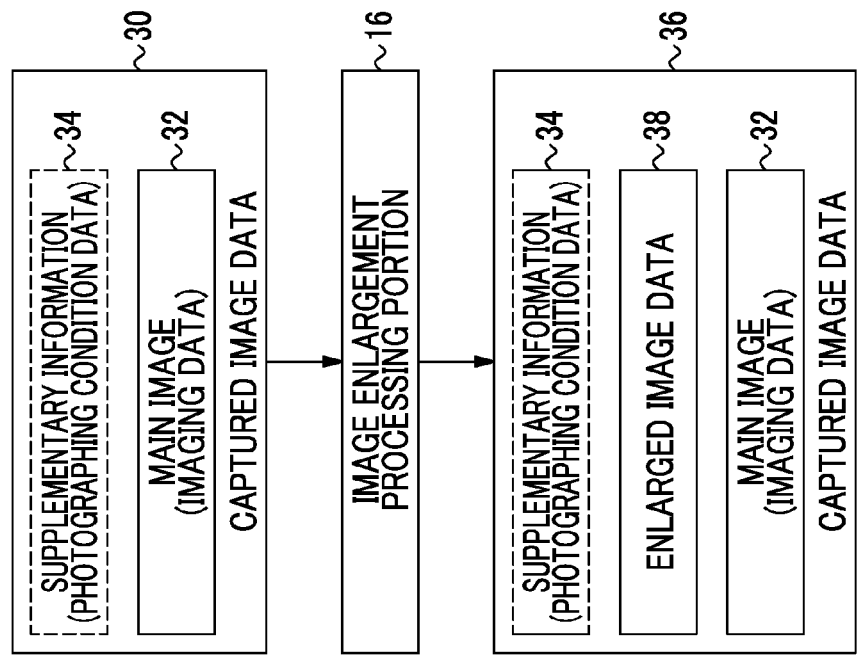

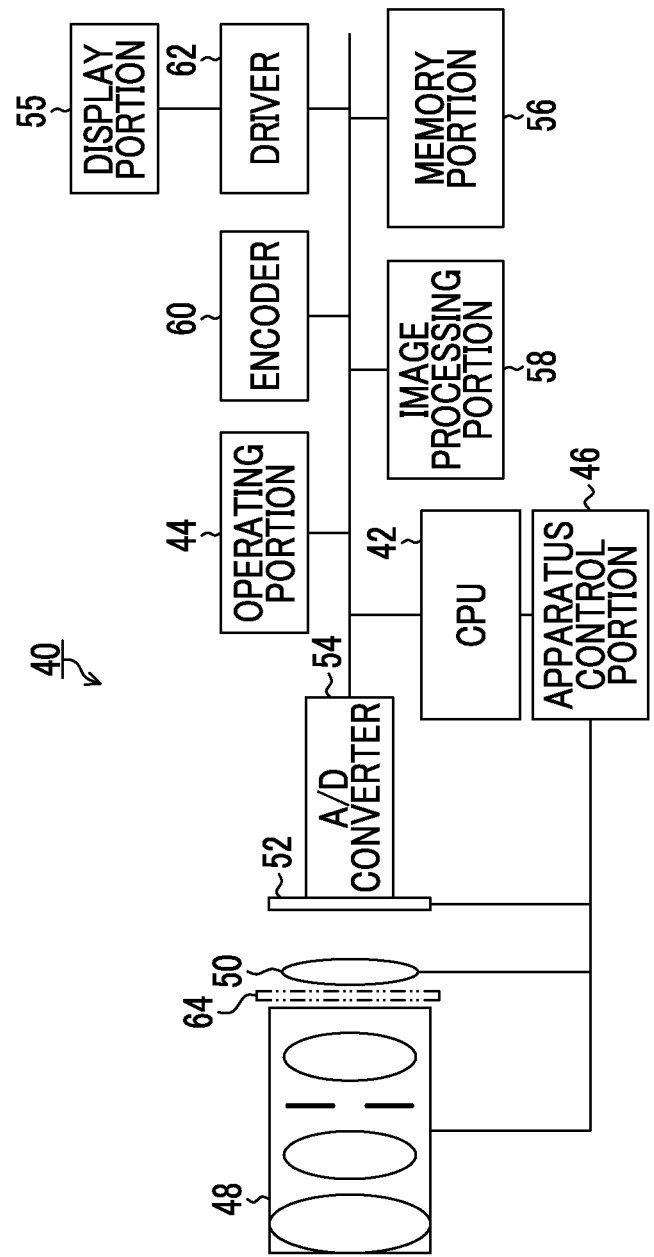

IMAGE PROCESSING DEVICE, IMAGING APPARATUS, COMPUTER, IMAGE PROCESSING METHOD, AND NON-TRANSITORY COMPUTER READABLE MEDIUM

CROSS REFERENCE TO RELATED APPLICATIONS

This application is a Continuation of PCT International Application No. PCT/JP2013/061876 filed on Apr. 23, 2013, which claims priority under 35 U.S.C §119(a) to Patent Application No. 2012-183984 filed in Japan on Aug. 23, 2012, all of which are hereby expressly incorporated by reference into the present application.

BACKGROUND OF THE INVENTION

1. Field of the Invention

The present invention relates to an image processing device, an imaging apparatus, a computer, an image processing method, and a program, and particularly to an image enlargement process of generating an enlarged image from a captured image.

2. Description of the Related Art

In a field of an imaging device such as a camera, a digital captured image is acquired by an imaging element (a CCD, a CMOS, or the like) in which color filters such as RGB are disposed. Image deterioration such as so-called moire, blurring, texture disturbance, a false color, or aliasing distortion may be visible in the captured image acquired as mentioned above, and, particularly, such image deterioration may notably occur in a magnified image generated from the captured image. For this reason, various techniques for minimizing image deterioration such as moire have been proposed.

For example, JP1993-328106A (JP-H05-328106A) discloses a technique in which a low-pass filter is changed depending on a detection result of an edge region, a variable magnification, and information designated by a user, and a smoothing process according to the image type and the variable magnification is performed on a magnified image which thus has less moire or blurring. In addition, JP2005-056006A discloses a technique in which a process target image formed by a plurality of pixel data items is acquired, and positions of the plurality of pixel data items are moved at random for each pixel data item within a peripheral region of each pixel data item so that moire is reduced regardless of a cycle of repeated features such as patterns or dots.

SUMMARY OF THE INVENTION

As in the technique disclosed in JP1993-328106A (JP-H05-328106A), it is effective to remove a component (high frequency component) with a high spatial frequency in order to minimize image deterioration such as moire, and a low-pass filter (LPF) is generally used. As such a low-pass filter, a low-pass filter using a signal process is used, and use of an optical low-pass filter (OLPF) which optically cuts a high frequency component from light applied to an imaging element is also progressing.

On the other hand, a captured image in which image deterioration such as moire is sufficiently minimized can be acquired even if a low-pass filter is not used, as a result of examining an array pattern of color filters. For this reason, a captured image with a higher resolution can be acquired without positively using an optical low-pass filter and losing a high frequency component depending on an array pattern of color filters.

As mentioned above, configurations and functions of imaging apparatuses are diversified, such as the presence or absence of the optical low-pass filter or use of color filters in various array patterns, but, in the related art as disclosed in JP1993-328106A (JP-H05-328106A) or JP2005-056006A, it is difficult to perform appropriate image enlargement processing corresponding to the diversification.

For example, in the technique disclosed in JP1993-328106A (JP-H05-328106A), the type of low-pass filter is changed depending on a variable magnification or the type of image, but a process according to whether or not an optical low-pass filter is present or a process for a case where an array pattern of color filters is changed is not disclosed or suggested.

In addition, in the same manner for JP2005-056006A, a moire reduction process technique is disclosed, but a more reduction process according to whether or not an optical low-pass filter is present or depending on an array pattern of color filters is not optimized. Therefore, in a case where the same image enlargement process is performed on a captured image which is obtained by using, for example, Bayer array color filters and a captured image which is obtained by using color filters with another pattern array in which examination for preventing moire or the like has been made, on the basis of the moire reduction process technique disclosed in JP2005-056006A, there is a possibility that resolution may differ between both of the images or image deterioration such as moire may be visible in one enlarged image.

As mentioned above, if captured images (image data), acquired from imaging devices in which types of color filters which are used or photographing conditions such as presence or absence of an optical low-pass filter are different from each other, are enlarged at an equal enlargement ratio, a case is expected in which the same image quality cannot be obtained in the captured images due to a difference in resolution or the like.

The present invention has been made in consideration of the above-described circumstances, and an object thereof is to provide a technique capable of performing an appropriate image enlargement process according to the presence or absence of an optical low-pass filter, or color filters with various array patterns so as to generate an enlarged image in which a reduction in resolution is prevented and image deterioration is invisible.

According to an aspect of the present invention, there is provided an image processing device to which image photographing data including imaging data is input, including a data acquisition unit that judges whether or not photographing condition data is included in the input image photographing data, and that acquires content of the photographing condition data in a case where it is judged that the photographing condition data is included in the input image photographing data; and an enlargement process determination unit that determines a process parameter for an enlargement process for generating enlarged image data from the image data, on the basis of the acquisition result of the photographing condition data by the data acquisition unit, an enlargement processing unit that performs an interpolation process in the enlargement process using the process parameter which is decided by the enlargement process determination unit, and the photographing condition data includes information regarding an array of color filters of an imaging portion used to create the imaging data and information regarding presence or absence of an optical low-pass filter during creation of the imaging data, and the enlargement process determination unit sets a lower limit of a range for the process parameter of the interpolation process for the imaging data when the imaging data is photographed by a bayer array imaging element having the optical low-pass filter, as higher than a lower limit of a range for the process parameter of the interpolation process for the imaging data when the imaging data is photographed by an imaging element having the array of color filter by which moiré is suppressed without the optical low pass filter.

According to the aspect, it is possible to determine at least one of execution or non-execution of an enlargement associated process, a process parameter of the enlargement associated process, and a process parameter for the enlargement process, on the basis of information regarding the presence or absence of an optical low-pass filter. Consequently, it is possible to optimize an enlargement associated process and an enlargement process in accordance with the presence or absence of an optical low-pass filter.

In addition, the "enlargement associated process" mentioned here is a concept which covers all processes associated with the enlargement process of imaging data, and includes a process for improving quality of an enlarged image which is obtained through the enlargement process. Specifically, the enlargement associated process includes a contour emphasis process or other processes for increasing image sharpness. Therefore, as the "process parameter for the enlargement associated process", for example, a parameter for defining a contour emphasis level in the contour emphasis process may be used, and, more specifically, a filter coefficient of a contour emphasis process filter may be used.

In addition, the "enlargement process" is a concept that covers all processes of increasing an image size of imaging data, and includes an image process of acquiring an enlarged image in which the number of horizontal pixels and/or the number of vertical pixels of an image reproduced by imaging data are (is) increased. For example, the enlargement process includes an image process of generating image data for an enlarged image on the basis of imaging data which causes a VGA, SVGA, XGA, SXGA, UXGA, QXGA, or full-size image (an image with the maximum size which can be obtained by an imaging element) or an image with other sizes to be reproduced. Therefore, as the "process parameter for the enlargement process", for example, a magnification in the enlargement process or a process parameter for an enlargement interpolation process may be used. Further, the aspect is especially effective to a process of increasing a size which causes a resolution to be reduced or image deterioration to be easily visible in an enlarged image, but a size of imaging data or a size of an enlarged image is not particularly limited.

In addition, the "optical low-pass filter" is a filter element which optically cuts a high frequency component of light, and may be appropriately disposed at a position where the high frequency component can be cut from light which is not applied to an imaging element. Further, information regarding the presence or absence of the optical low-pass filter may be directly included in photographing condition data, and, for example, other information such as a model name from which the information regarding the presence or absence of the optical low-pass filter can be indirectly obtained may be included in photographing condition data, as in a case where the presence or absence of the optical low-pass filter is determined for each model of an imaging device.

Preferably, the enlargement process determination unit sets the lower limit of the range for the process parameter of the interpolation process for the imaging data when the imaging data is photographed by a bayer array imaging element, as higher than the lower limit of the range for the process parameter of the interpolation process for the imaging data when the imaging data is photographed by the non-bayer array imaging element.

According to the aspect, it is possible to determine at least one of execution or non-execution of an enlargement associated process, a process parameter of the enlargement associated process, and a process parameter for the enlargement process, on the basis of information regarding an array of color filters. Consequently, it is possible to optimize an enlargement associated process and an enlargement process in accordance with array pattern characteristics of color filters.

In addition, the "color filter" is a filter element for judging light intensity for each color by transmitting light therethrough when the light is applied to an imaging element, and, primary color filters (red, green, blue, and the like) or complementary color filters (cyan, magenta, yellow, green, and the like) may be used as the color filters. Further, array patterns or constituent color elements of color filters are not particularly limited. Information regarding an array of color filters may be directly included in photographing condition data, and, for example, other information such as a model name from which the information regarding an array of color filters can be indirectly obtained may be included in photographing condition data, as in a case where an array of color filters is determined for each model of an imaging device.

Preferably, the enlargement process determination unit sets the lower limit of the range for the process parameter of the interpolation process for the imaging data when the imaging data is photographed by the bayer array imaging element having the optical low-pass filter, as higher than the lower limit of a range for the process parameter of the interpolation process for the imaging data when the imaging data is photographed by an non-bayer array imaging element having the optical low-pass filter, and sets the lower limit of a range for the process parameter of the interpolation process for the imaging data when the imaging data is photographed by the imaging element without the optical low-pass filter, as lower than the lower limit of a range for the process parameter of the interpolation process for the imaging data when the imaging data is photographed by the non-bayer imaging element without the optical low-pass filter.

According to the aspect, it is possible to perform an enlargement process after image sharpness is increased in imaging data through the contour emphasis process. Consequently, it is possible to further prevent a reduction in resolution or image deterioration in an enlarged image obtained through the enlargement process. In addition, the "contour emphasis process" mentioned here may be any process (sharpness process) of emphasizing a contour part of an image, and is not particularly limited.

According to another aspect of the present invention, there is provided an image processing device to which image photographing data including imaging data is input, including a data acquisition unit that judges whether or not photographing condition data is included in the input image photographing data, and that acquires content of the photographing condition data in a case where it is judged that the photographing condition data is included in the input image photographing data; and an enlargement process determination unit that determines, a process parameter for an enlargement process for generating enlarged image data from the image data, on the basis of the acquisition result of the photographing condition data by the data acquisition unit, an enlargement processing unit that performs an enlargement process in the using an enlargement ratio which is decided by the enlargement process determination unit, and the photographing condition data includes information regarding an array of color filters of an imaging portion used to create the imaging data and information regarding presence or absence of an optical low-pass filter during creation of the imaging data, and the enlargement process determination unit sets a upper limit of a range for the process parameter of the enlargement process for the imaging data when the imaging data is photographed by a bayer array imaging element having the optical low-pass filter, as lower than a upper limit of a range for the process parameter of the enlargement process for the imaging data when the imaging data is photographed by an imaging element having the array of color filter by which moiré is suppressed without the optical low pass filter.

According to the aspect, it is possible to perform an enlargement process on imaging data on the basis of a magnification according to photographing condition data (information regarding the presence or absence of an optical low-pass filter or an array of color filters). Consequently, it is possible to further prevent a reduction in resolution or image deterioration in an enlarged image obtained through the enlargement process.

Preferably, the enlargement process determination unit sets the upper limit of the range for the process parameter of the enlargement process for the imaging data when the imaging data is photographed by the bayer array imaging element, as lower than the upper limit of the range for the process parameter of the enlargement process for the imaging data when the imaging data is photographed by the imaging element having the array of color filter by which moiré is suppressed without the optical low pass filter.

According to the aspect, it is possible to perform an interpolation process of the enlargement process on the basis of a process parameter in accordance with photographing condition data (information regarding the presence or absence of an optical low-pass filter or an array of color filters). Consequently, it is possible to further prevent image deterioration in an enlarged image obtained through the enlargement process. In addition, the interpolation process mentioned here is not particularly limited, and may employ any interpolation process which causes desired enlarged image data to be obtained.

As such an interpolation process, there is, for example, a nearest neighbor method, a bi-linear interpolation method, a bi-cubic convolution interpolation method, a spline interpolation method, or other interpolation process methods.

Preferably, the enlargement process determination unit sets the upper limit of the range for the process parameter of the enlargement process for the imaging data when the imaging data is photographed by the bayer array imaging element having the optical low-pass filter, as lower than the upper limit of the range for the process parameter of the enlargement process for the imaging data when the imaging data is photographed by an non-bayer array imaging element having the optical low-pass filter, and sets the upper limit of the range for the process parameter of the enlargement process for the imaging data when the imaging data is photographed by the imaging element without the optical low-pass filter, as higher than the upper limit of the range for the process parameter of the enlargement process for the imaging data when the imaging data is photographed by the non-bayer imaging element having the optical low-pass filter.

As in the aspect, since the enlargement process is performed by using the interpolation process based on the spline interpolation process method which is excellent in interpolation reproducibility, it is possible to generate imaging data of an enlarged image in which a reduction in resolution or image deterioration scarcely occurs and which has good image quality.

The spline interpolation process method is a well-known method, but an interpolation method is not particularly limited. Therefore, for example, an enlargement process may be performed on the basis of a spline interpolation process method disclosed in JP1997-050515A (JP-H09-050515A), for example.

Preferably, the image photographing data, including the imaging data items which are created by a plurality of imaging portions including at least a first imaging portion and a second imaging portion, is input to the image processing device, and the enlargement process determination unit determines at least one of the execution or non-execution of the enlargement associated process, the process parameter for the enlargement associated process, and the process parameter for the enlargement process so that image quality by the enlarged image data after the enlargement process is performed between the image photographing data created by the first imaging portion and the image photographing data created by the second imaging portion is included in a predetermined allowable range.

According to the aspect, in a case where the image photographing data items created by a plurality of imaging portions are input to the image processing device, at least one of the execution or non-execution of the enlargement associated process, the process parameter for the enlargement associated process, and the process parameter for the enlargement process is determined so that image quality after the enlargement process is performed between the image photographing data created by the first imaging portion and the image photographing data created by the second imaging portion is included in a predetermined allowable range. Therefore, even in a case where imaging performances of a plurality of imaging portions are different from each other, it is possible to generate enlarged images with uniform image quality.

The term "quality of an enlarged image after the enlargement process is performed being included in a predetermined allowable range" mentioned here indicates that quality of an image obtained through the enlargement process is included in the predetermined allowable range, and refers to, for example, various parameters which cause a reduction in a resolution or image deterioration (moire or the like) in an enlarged image being included in the predetermined allowable range. A spatial frequency, a saturation level, or the like may be used as a reference of the "quality of an enlarged image".

In addition, the "imaging portion" is a concept which covers various apparatuses contributing to generation of imaging data. An imaging element itself may be grasped as an imaging portion, and an entire configuration including lenses which guide light to the imaging element may be grasped as an imaging portion. Therefore, the aspect is applicable to an image processing device which receives image photographing data including imaging data items which are created by imaging devices having different imaging elements, different lenses, or different configurations between lenses and imaging elements.

Preferably, the image processing device further includes enlargement associated processing unit performs the enlargement associated process according to a determination result from the enlargement process determination unit.

According to the aspect, it is possible for the enlargement associated processing unit to perform the enlargement associated process on imaging data on the basis of execution or non-execution of the enlargement associated process associated with an enlargement process of the imaging data determined according to photographing condition data and a determination result of a process parameter for the enlargement associated process. Therefore, in a case where it is judged that the enlargement associated process is not necessary on the basis of the photographing condition data, the enlargement associated process is not performed, and the enlargement associated process can be performed by using a process parameter which is suitable for the photographing condition data.

Preferably, the image processing device further includes enlargement processing unit performs the enlargement process according to a determination result from the enlargement process determination unit.

According to the aspect, it is possible for the enlargement processing unit to perform an enlargement process on the basis of a process parameter for the enlargement process determined according to photographing condition data. Therefore, the enlargement process can be performed by using a process parameter which is suitable for the photographing condition data.

Preferably, the image processing device further includes display unit for displaying a determination result by the enlargement process determination unit.

According to the aspect, a user can confirm a determination result by the enlargement process determination unit, from display performed by the display unit. Here, a display method performed by the display unit is not particularly limited. A warning or a notification of the determination result by the enlargement process determination unit may be sent to the user, and selection display may be performed so that the user accepts (settles)/refuses (unsettles) the determination result by the enlargement process determination unit.

Preferably, the display unit displays a settlement of the determination result by the enlargement process determination unit related to the execution or non-execution of the enlargement associated process in a selectable manner, the image processing device further comprises selection unit receiving a user's selection regarding the settlement of the determination result by the enlargement process determination unit, and the enlargement process determination unit settles execution or non-execution of the enlargement associated process according to a selection result which is received via the selection unit.

According to the aspect, a user can settle and select the determination result (execution or non-execution of the enlargement associated process) by the enlargement process determination unit, displayed on the display unit, and thus it is possible to determine execution or non-execution of the enlargement associated process according to a user's selection result.

Preferably, the process parameter for the enlargement associated process and the process parameter for the enlargement process determined by the enlargement process determination unit include a plurality of selection candidates, the display unit performs display so that the process parameter for the enlargement associated process and the process parameter for the enlargement process can be selected from among the plurality of selection candidates, the image processing device further comprises selection unit for receiving a user's selection from among the plurality of selection candidates, and the enlargement process determination unit settles the process parameter for the enlargement associated process and the process parameter for the enlargement process according to a selection result which is received via the selection unit.

According to the aspect, a user can select a process parameter for the enlargement associated process and a process parameter for the enlargement process from among a plurality of selection candidates displayed on the display unit, and thus it is possible to determine a process parameter for the enlargement associated process and a process parameter for the enlargement process according to a user's selection result. Therefore, the user easily selects the optimum process parameter by optimizing a range of selection candidates in accordance with photographing condition data.

Preferably, the image processing device further includes enlargement associated processing unit performs the enlargement associated process according to the settled execution or non-execution of the enlargement associated process and the settled process parameter for the enlargement associated process.

According to the aspect, it is possible for the enlargement associated processing unit to perform an enlargement associated process on imaging data on the basis of a determination result of the settled execution or non-execution of the enlargement associated process or the settled process parameter for the enlargement associated process. Therefore, in a case where a user judges that the enlargement associated process is not necessary on the basis of the photographing condition data, the enlargement associated process is not performed, and the enlargement associated process can be performed by using a process parameter which is suitable for the photographing condition data in accordance with a user's intention.

Preferably, the image processing device further includes enlargement processing unit performs the enlargement process according to the settled process parameter for the enlargement process.

According to the aspect, it is possible for the enlargement processing unit to perform an enlargement process on the basis of the settled process parameter for the enlargement process. Therefore, it is possible to perform an enlargement process based on a process parameter which is suitable for photographing condition data, in accordance with a user's intention.

According to still another aspect of the present invention, there is provided an imaging apparatus including an imaging unit that includes an imaging portion which creates image photographing data including imaging data; and the image processing device.

The imaging apparatus of the aspect is not particularly limited. Not only a digital camera which has an imaging function as a main function but also mobile apparatuses having other functions (a call function, a communication function, and other computer functions) other than the imaging function may be included in the imaging apparatus mentioned here.

According to still another aspect of the present invention, there is provided an imaging apparatus including an imaging unit that includes a plurality of imaging portions which include at least a first imaging portion and a second imaging portion; and the image processing device.

The imaging apparatus of the aspect is not particularly limited. Not only a digital camera (for example, a 3D compatible camera) which includes a plurality of imaging portions and has an imaging function as a main function but also mobile apparatuses having other functions (a call function, a communication function, and other computer functions) other than the imaging function may be included in the imaging apparatus mentioned here.

According to still another aspect of the present invention, there is provided an imaging apparatus including an imaging unit that includes an imaging portion which creates image photographing data including imaging data, in which the imaging portion is interchangeable with one of a plurality of imaging portions including a first imaging portion and a second imaging portion; and the image processing device.

The imaging apparatus of the aspect is not particularly limited. For example, a digital camera of which a lens or an imaging element (a CCD, a CMOS, or the like) can be interchanged by a user may be included in the imaging apparatus mentioned here.

According to still another aspect of the present invention, there is provided a computer including the image processing device.

According to still another aspect of the present invention, there is provided an image processing method including a data acquisition step of judging whether or not photographing condition data is included in image photographing data including imaging data, and for acquiring content of the photographing condition data in a case where it is judged that the photographing condition data is included in the input image photographing data; and an enlargement process determination step of determining a process parameter for an enlargement process for generating enlarged image data from the image data, on the basis of the acquisition result of the photographing condition data, an enlargement processing step of performing an interpolation process in the enlargement process using the process parameter which is decided by the enlargement process determination step, and the photographing condition data includes information regarding an array of color filters of an imaging portion used to create the imaging data and information regarding presence or absence of an optical low-pass filter during creation of the imaging data, and the enlargement process determination step sets a lower limit of a range for the process parameter of the interpolation process for the imaging data when the imaging data is photographed by a bayer array imaging element having the optical low-pass filter, as higher than a lower limit of a range for the process parameter of the interpolation process for the imaging data when the imaging data is photographed by an imaging element having the array of color filter by which moiré is suppressed without the optical low pass filter.

According to still another aspect of the present invention, there is provided an image processing method including a data acquisition step of judging whether or not photographing condition data is included in image photographing data including imaging data, and for acquiring content of the photographing condition data in a case where it is judged that the photographing condition data is included in the input image photographing data; and an enlargement process determination step of determining, a process parameter for an enlargement process for generating enlarged image data from the image data, on the basis of the acquisition result of the photographing condition data by the data acquisition step, an enlargement processing step of performing an enlargement process in the using an enlargement ratio which is decided by the enlargement process determination step, and the photographing condition data includes information regarding an array of color filters of an imaging portion used to create the imaging data and information regarding presence or absence of an optical low-pass filter during creation of the imaging data, and the enlargement process determination step sets a upper limit of a range for the process parameter of the enlargement process for the imaging data when the imaging data is photographed by a bayer array imaging element having the optical low-pass filter, as lower than a upper limit of a range for the process parameter of the enlargement process for the imaging data when the imaging data is photographed by an imaging element having the array of color filter by which moiré is suppressed without the optical low pass filter.

According to still another aspect of the present invention, there is provided a non-transitory computer readable medium storing a program causing a computer to execute a procedure of judging whether or not photographing condition data is included in image photographing data including imaging data, and for acquiring content of the photographing condition data in a case where it is judged that the photographing condition data is included in the input image photographing data; and a procedure of determining a process parameter for an enlargement process for generating enlarged image data from the image data, on the basis of the acquisition result of the photographing condition data, a procedure of an enlargement processing that performs an interpolation process in the enlargement process using the process parameter which is decided by the procedure of determining the process parameter, and the photographing condition data includes information regarding an array of color filters of an imaging portion used to create the imaging data and information regarding presence or absence of an optical low-pass filter during creation of the imaging data, and the enlargement process determination procedure sets a lower limit of a range for the process parameter of the interpolation process for the imaging data when the imaging data is photographed by a bayer array imaging element having the optical low-pass filter, as higher than a lower limit of a range for the process parameter of the interpolation process for the imaging data when the imaging data is photographed by an imaging element having the array of color filter by which moiré is suppressed without the optical low pass filter.

According to still another aspect of the present invention, there is provided a non-transitory computer readable medium storing a program causing a computer to execute a procedure of judging whether or not photographing condition data is included in image photographing data including imaging data, and for acquiring content of the photographing condition data in a case where it is judged that the photographing condition data is included in the input image photographing data; and a procedure of determining a process parameter for an enlargement process for generating enlarged image data from the image data, on the basis of the acquisition result of the photographing condition data, a procedure of an enlargement processing that performs an interpolation process in the enlargement process using the process parameter which is decided by the procedure of determining the process parameter, and the photographing condition data includes information regarding an array of color filters of an imaging portion used to create the imaging data and information regarding presence or absence of an optical low-pass filter during creation of the imaging data, and the enlargement process determination procedure sets a upper limit of a range for the process parameter of the enlargement process for the imaging data when the imaging data is photographed by a bayer array imaging element having the optical low-pass filter, as lower than a upper limit of a range for the process parameter of the enlargement process for the imaging data when the imaging data is photographed by an imaging element having the array of color filter by which moiré is suppressed without the optical low pass filter.

According to the present invention, it is possible to determine at least one of execution or non-execution of an enlargement associated process, a process parameter of the enlargement associated process, and a process parameter for an enlargement process, on the basis of information regarding the presence or absence of an optical low-pass filter during creation of imaging data or information regarding an array of color filters of the imaging portion. Consequently, it is possible to optimize an enlargement associated process and an enlargement process in accordance with the presence or absence of an optical low-pass filter or an array of color filters of the imaging portion, and thus to generate an enlarged image in which a reduction in resolution is prevented or image deterioration is not visible.

BRIEF DESCRIPTION OF THE DRAWINGS

FIGS. 1A to 1C are functional block diagrams exemplifying apparatuses to which the present invention is applicable, in which FIG. 1A illustrates an example of an imaging device including a single imaging portion, FIG. 1B illustrates an example of an imaging device including two (a plurality of) imaging portions, and FIG. 1C illustrates an example in which an imaging portion and an image enlargement processing portion are provided separately from each other.

FIGS. 2A and 2B are diagrams illustrating schematic input and output image photographing data of the image enlargement processing portion, in which FIG. 2A illustrates a data structure before and after being processed in the image enlargement processing portion, and FIG. 2B illustrates an example of supplementary information (photographing condition data).

FIG. 3 is a block diagram illustrating an embodiment of an imaging apparatus (digital camera).

FIGS. 4A and 4B are diagrams illustrating basic array pattern examples of color filters, in which FIG. 4A illustrates color filters with a Bayer array, and FIG. 4B illustrates color filters with another type of array ("X-Trans" (registered trademark)).

FIGS. 7A and 7B are flowcharts illustrating flows of an image enlargement process of a first embodiment, in which FIG. 7A is a flowchart related to a process A (enlargement associated process), and FIG. 7B is a flowchart in a case where a contour emphasis process is employed as the process A.

FIGS. 9A and 9B are flowcharts illustrating flows of an enlargement process of a second embodiment, in which FIG. 9A is a flowchart related to a process A (enlargement associated process), and FIG. 9B is a flowchart in a case where a contour emphasis process is employed as the process A.

FIGS. 10A and 10B are flowcharts illustrating flows of an enlargement process of a third embodiment, in which FIG. 10A is a flowchart related to a process B (enlargement process), and FIG. 10B is a flowchart in a case where an enlargement process based on a spline interpolation processing method is employed as the process B.

DESCRIPTION OF THE PREFERRED EMBODIMENTS

Hereinafter, embodiments of the present invention will be described with reference to the accompanying drawings. First, a summary of the present invention will be described prior to description of specific application examples. In addition, configurations described below are only an example, and the present invention is applicable to other configurations. Further, each configuration can be realized as appropriate by any hardware, software, or a combination thereof.

The present invention relates to an enlargement processing technique of a captured image and is applicable to general apparatuses which can perform image processes on a captured image. Therefore, the present invention can be realized by, for example, an imaging device such as a camera which can captures an image or a computer which is connected to the imaging device.

Figure 1A:
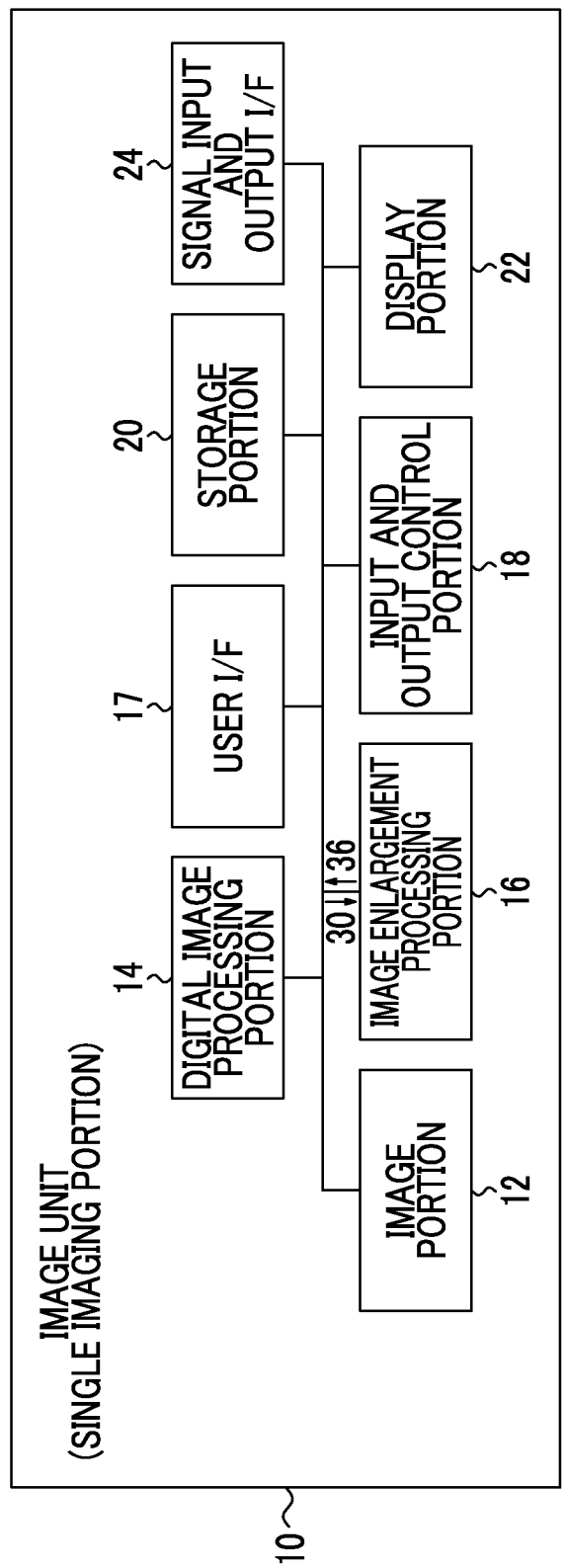

FIG. 1A is a functional block diagram illustrating an example of an imaging device including a single imaging portion, and FIG. 1B is a functional block diagram illustrating an example of an imaging device including two (a plurality of) imaging portions. In addition, FIG. 1C is a functional block diagram illustrating an example of an imaging device and a computer connected to the imaging device.

An imaging unit 10 illustrated in FIG. 1A includes an imaging portion 12, a digital image processing portion 14, an image enlargement processing portion 16, a user I/F (interface) 17, an input and output control portion 18, a storage portion 20, a display portion 22, and a signal input and output I/F (interface) 24, which are connected to each other.

The imaging portion 12 includes, for example, a lens, a diaphragm, a shutter, and an imaging element (a CCD, a CMOS, or the like) in which color filters are disposed, as necessary, and performs photographing so as to generate imaging data. In addition, an optical low-pass filter (OLPF) described later may or not be provided in the imaging portion 12.

The digital image processing portion 14 performs, on the imaging data generated by the imaging portion 12, digital image processes, for example, an offset correction process, a white balance (WB) correction process, an overexposure pixel detection and correction process, an exposure correction process, a γ (gamma) correction process, and a synchronization process.

In addition, data on photographing conditions (photographing condition data (the imaging date, the number of pixels, an F value (a diaphragm value), and the like)) when the imaging data is acquired by the imaging portion 12 may be added to the imaging data. The photographing condition data may be added to imaging data in the imaging portion 12 during imaging, and may be added to imaging data in the digital image processing portion 14 or the like after the imaging. In a case where photographing condition data is not added to imaging data, the photographing condition data is not included, but image photographing data including the imaging data is generated. The image photographing data generated in the above-described manner is sent to the image enlargement processing portion 16 of the rear stage.

The image enlargement processing portion 16 generates an enlarged image of the captured image on the basis of the image photographing data which is input. Although details thereof will be described later, as illustrated in FIG. 2A, image photographing data 30 including photographing data (main image) 32 and photographing condition data (supplementary information) 34 is used to generate an enlarged image in the image enlargement processing portion 16, and is output from the image enlargement processing portion 16 as image photographing data 36 which further includes enlarged image data 38. Particularly, in the following embodiments, in a case where the photographing condition data 34 includes "information regarding the presence or absence of an optical low-pass filter" and/or "information regarding an array pattern of color filters", the image enlargement processing portion 16 can generate an enlarged image with good image quality by performing an image enlargement process which is optimized for the "information regarding the presence or absence of an optical low-pass filter" and/or the "information regarding an array pattern of color filters". In addition, the image photographing data 36 may be sufficiently interpreted in a broad sense as long as the image photographing data 30 is associated with the imaging data 32.

The image photographing data 30 which is input to the image enlargement processing portion 16 may not include photographing condition data (particularly, "information regarding the presence or absence of an optical low-pass filter" and/or the "information regarding an array pattern of color filters") 34 as illustrated in FIG. 2B. In this case, the image enlargement processing portion 16 performs an image enlargement process which is suitable for the imaging data 32 to which photographing condition data is not added, so as to generate an enlarged image.

Details of the image enlargement process in the image enlargement processing portion 16 will be described later (refer to FIGS. 6 to 17).

Outputting of the image photographing data 36 including the "enlarged image data 38" and the "photographing data (main image) 32" is controlled by the input and output control portion 18 illustrated in FIG. 1A so as to be stored in the storage portion (a memory or the like) 20, to be used to display the enlarged image on the display portion (a liquid crystal display or the like) 22, or to be output to an external device via the signal input and output I/F 24.

In addition, information on various processes in the imaging portion 12, the digital image processing portion 14, the image enlargement processing portion 16, and the input and output control portion 18 can be provided to a user via the display portion 22. The user may send control instruction signals to the imaging portion 12, the digital image processing portion 14, the image enlargement processing portion 16, and the input and output control portion 18, via the user I/F 17, while confirming information displayed on the display portion 22.

The above-described enlarged image generation process can also be performed by an imaging unit 10' including a plurality of imaging portions (a first imaging portion 12A and a second imaging portion 12B) as illustrated in FIG. 1B. In other words, in the same manner as in the imaging unit 10 (FIG. 1A) including the single imaging portion, imaging data generated by each of the first imaging portion 12A and the second imaging portion 12B is subject to digital image processes in the digital image processing portion 14, so as to be used to generate an enlarged image in the image enlargement processing portion 16. Inputting and outputting of the image photographing data 36 including the enlarged image are controlled by the input and output control portion 18, and thus the image photographing data 36 is stored in the storage portion 20, used to display the enlarged image on the display portion 22, or output to an external device via the signal input and output I/F 24. In addition, similarly, the user may send control instruction signals to the imaging portions (the first imaging portion 12A and the second imaging portion 12B), the digital image processing portion 14, the image enlargement processing portion 16, and the input and output control portion 18, via the user I/F 17.

Further, an imaging unit may be employed in which an imaging portion is interchangeable, and one of a plurality of imaging portions including at least a first imaging portion and a second imaging portion can be selectively interchanged. For example, there may be a configuration in which the first imaging portion 12A and the second imaging portion 12B illustrated in FIG. 1B are attachable and detachable, and either one of the first imaging portion 12A and the second imaging portion 12B is selected and used. As apparatuses employing this configuration, there is, for example, a camera (lens interchangeable camera) in which a lens unit (imaging portion) including a lens to an imaging element can be replaced.

FIGS. 1A and 1B illustrate an example in which the imaging portions 12, 12A and 12B and the image enlargement processing portion 16 are provided in a single component, but the imaging portions and the image enlargement processing portion may be provided separately from each other as illustrated in FIG. 1C.

For example, the present invention is applicable to a system in which an imaging unit 10" including the imaging portion 12 and a computer 11 including the image enlargement processing portion 16 can be connected to each other via mutual signal input and output I/Fs 24A and 24B.

In this case, the digital image processing portion may be provided in the imaging unit 10" side (refer to the reference numeral "14A" of FIG. 1C), and may be provided in the computer 11 side (refer to the reference numeral "14B" of FIG. 1C). In a case where the digital image processing portion 14A is provided in the imaging unit 10" side, image photographing data having undergone digital image processes is output from the imaging unit 10" via the signal input and output I/F 24A and is input to the computer 11 via the signal input and output I/F 24B. The image photographing data 30 which is input to the computer 11 is, as described above, used to generate an enlarged image in the image enlargement processing portion 16. The image photographing data 36 including the enlarged image is controlled by the input and output control portion 18 so as to be output to the storage portion 20, the display portion 22, and the signal input and output I/F 24B as appropriate. In addition, in a case where the digital image processing portion 14B is provided in the computer 11 side, the image photographing data 30 including photographing data (raw data or the like) having not undergone digital image processes is output from the imaging unit 10" via the signal input and output I/F 24A and is input to the computer 11 via the signal input and output I/F 24B. The image photographing data 30 which is input to the computer 11 is, as described above, subject to digital image processes in the digital image processing portion 14B so as to be used to generate an enlarged image in the image enlargement processing portion 16. The image photographing data 36 including the enlarged image is controlled by the input and output control portion 18 so as to be output to the storage portion 20, the display portion 22, and the signal input and output I/F 24B as appropriate.

Further, this functional configuration is applicable not only to an "imaging apparatus (system) provided with the imaging unit 10" including the imaging portion 12 which creates the image photographing data 30 including the imaging data 32 and the computer 11 including the image enlargement processing portion (image processing device) 16″ illustrated in FIG. 1C, but also to an "imaging apparatus (system) provided with the imaging unit 10′ having a plurality of imaging portions including at least the first imaging portion 12A and the second imaging portion 12B and a computer having the image enlargement processing portion (image processing device) 16″ as in a case where the imaging unit 10′ illustrated in FIG. 1B is connected to the computer 11.

Next, a specific example will be described in a case where the imaging unit 10 of the type illustrated in FIG. 1A is applied to a digital camera.

FIG. 3 is a block diagram illustrating an embodiment of an imaging apparatus (digital camera).

An imaging apparatus 40 is a digital camera which records a captured image in an internal memory (memory portion 56) or an external recording medium (not illustrated), and an operation of the entire apparatus is collectively controlled by a central processing unit (CPU) 42.

The imaging apparatus 40 is provided with an operation portion 44 including a shutter button (shutter switch), a mode dial, a reproduction button, a MENU/OK key, a cross key, a zoom button, a BACK key, and the like. A signal from the operation portion 44 is input to the CPU 42, and the CPU 42 controls each circuit of the imaging apparatus 40 on the basis of the input signal, so as to control a lens portion 48, a shutter 50, and an imaging element 52 which functions as image acquisition unit, for example, via an apparatus control portion 46, and to perform photographing operation control, image processing control, recording/reproduction control of image data, display control of a display portion 55, and the like.

The lens portion 48 includes a focus lens, a zoom lens, a diaphragm, and the like, and light beams which have passed through the lens portion 48 and the shutter 50 form an image on a light receiving surface of the imaging element 52.

The imaging element 52 is a color image sensor of a complementary metal-oxide semiconductor (CMOS) type, an XY address type, a charge coupled device (CCD) type, or the like, and has a structure in which color filters and a plurality of light receiving elements (photodiodes) which receive light passing through the color filters are arranged in a two-dimensional manner. A subject image formed on a light receiving surface of each photodiode is converted into a signal voltage (or electric charge) corresponding to an amount of incident light.

Figure 4A:
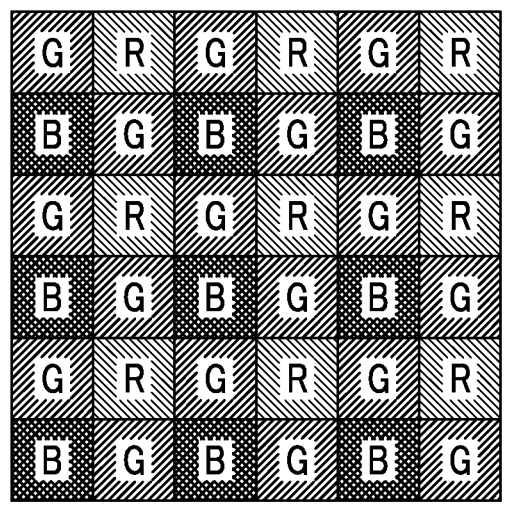
Figure 4B:
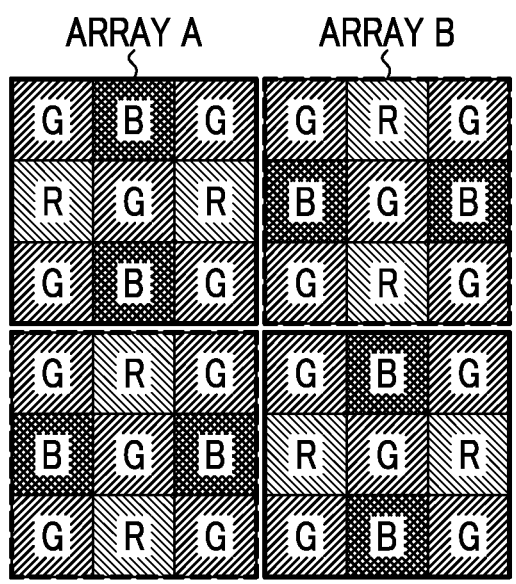

FIGS. 4A and 4B are diagrams illustrating basic array pattern examples of color filters, in which FIG. 4A illustrates color filters with a so-called Bayer array, and FIG. 4B illustrates color filters with another array (in the present specification, referred to as an "X-Trans" (registered trademark) array). In addition, in FIGS. 4A and 4B, "R" indicates a red filter, "G" indicates a green filter, and "B" indicates a blue filter.

The color filters of the imaging element 52 of this example are configured by repeatedly arranging basic array patterns P each of which is formed by a square array pattern corresponding to M×N (2×2, 6×6, or the like) pixels, in the horizontal direction and the vertical direction. Therefore, when an image process or the like is performed on RGB raw data items (mosaic image) read from the imaging element 52, the process can be performed according to the repeated patterns. In this color filter array, filters (the R filter, the G filter, and the B filter) having respective colors including red (R), green (G), and blue (B) are arranged with a predetermined cycle.

For example, in the color filters with the Bayer array illustrated in FIG. 4A, rows (horizontal direction rows) in which the G filters and the R filters are alternately disposed and rows in which the G filters and the B filters are alternately disposed are alternately disposed in the vertical direction, and the G filters are disposed vertical and horizontal positions of each R filter and each B filter. In addition, the B filters are disposed at positions in the diagonal directions of each R filter, the R filters are disposed at positions in the diagonal directions of each B filter, and the G filters are disposed at positions in the diagonal directions of each G filter.

On the other hand, in the color filters with another array illustrated in FIG. 4B, an array A of 3×3 pixels surrounded by a solid line frame and an array B of 3×3 pixels surrounded by a dashed line frame are alternately arranged in the horizontal direction and the vertical direction.

In the arrays A and B, the G filters are disposed at four corners and a center, and thus the G filters are disposed on both diagonal lines. In the array A, the R filters are arranged in the horizontal direction with the central G filter interposed therebetween, and the B filters are arranged in the vertical direction with the central G filter interposed therebetween. On the other hand, in the array B, the B filters are arranged in the horizontal direction with the central G filter interposed therebetween, and the R filters are arranged in the vertical direction with the central G filter interposed therebetween. In other words, the array A and the array B are reverse to each other in a positional relationship between the R filter and the B filter, but are the same as each other in other arrangements.

In addition, the G filters at the four corners of each of the arrays A and B constitute G filters with a square array corresponding to 2×2 pixels as a result of the arrays A and B being alternately arranged in the horizontal direction and the vertical direction.

Figure 5:
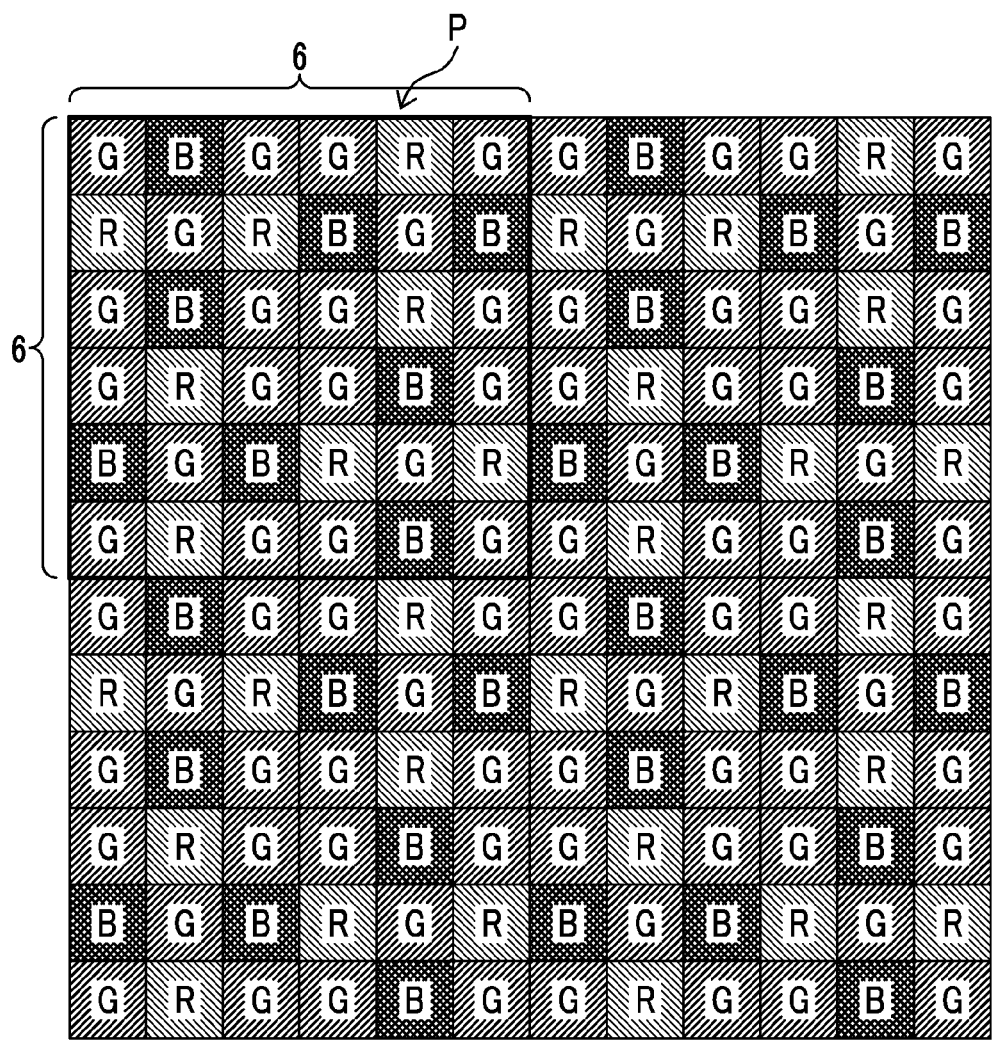
FIG. 5 illustrates a color filter array in which the basic array pattern of the color filters illustrated in FIG. 4B is arranged in twos in each of the horizontal direction and the vertical direction.

FIG. 5 illustrates a color filter array in which the basic array pattern of the color filters illustrated in FIG. 4B is arranged in twos in each of the horizontal direction and the vertical direction. In this color filter array, as is clear from FIG. 5, one or more G filters corresponding to a color (in the present embodiment, G) which most contributes to obtaining a luminance signal are disposed in each of lines in the horizontal direction, the vertical direction, the diagonally upper right (NE) direction, and the diagonally upper left (NW) direction of the color filter array.

NE indicates the diagonally upper right direction in FIG. 5, and NW indicates the diagonally lower right direction in FIG. 5. For example, in a case of a square pixel array, the diagonally upper right and diagonally lower right directions are respectively directions of 45° with respect to the horizontal direction, but, in a case where each filter is rectangular, NE and NW are diagonal directions of each rectangular filter and angles thereof may be changed depending on lengths of a long side and a short side.

According to the color filter array, since the G filter corresponding to a luminance system pixel is disposed in each of the lines in the horizontal direction, the vertical direction, and the diagonal directions (NE and NW) of the color filter array, it is possible to improve reproduction accuracy of a synchronization process in a high frequency region regardless of a direction in which a high frequency appears.

In addition, in the color filter array illustrated in FIG. 5, one or more R filters and B filters corresponding to two or more different colors (in the present embodiment, R and B) other than G are disposed in each of the lines in the horizontal direction and the vertical direction of the basic array pattern.

According to the color filter array illustrated in FIG. 5, the R filters and the B filters are disposed in each line in the horizontal direction and the vertical direction of the color filter array, and thus it is possible to reduce the occurrence of a false color (color moire). Consequently, it is possible to omit an optical low-pass filter for reducing (minimizing) the occurrence of a false color. In addition, even in a case where an optical low-pass filter is applied, an optical low-pass filter having a weak function of cutting a high frequency component in order to prevent the occurrence of a false color can be applied, and thus resolution is not damaged.

Further, in the basic array pattern P of the color filter array illustrated in FIG. 5, the numbers of R pixels, G pixels, and B pixels corresponding to the R, G and B filters in the basic array pattern are respectively eight, twenty, and eight. In other words, a ratio of the numbers of RGB pixels is 2:5:2, and thus a proportion of the number of G pixels which most contribute to obtaining a luminance signal is higher than proportions of the numbers of R pixels and B pixels of the other colors.

As described above, in the color filter array illustrated in FIG. 5, the proportions of the number of G pixels and the numbers of R and B pixels are different from each other, and, particularly, the proportion of the number of G pixels which most contributes to obtaining a luminance signal is higher than the proportions of the numbers of R and B pixels. Thus, it is possible to minimize aliasing in a synchronization process and to improve high frequency reproducibility.

Signal electric charge, which is accumulated in the imaging element 52 provided with the color filters having the basic pattern illustrated in FIG. 4A or 4B, is read as a voltage signal corresponding to the signal electric charge on the basis of a reading signal applied from the apparatus control portion 46. The voltage signal read from the imaging element 52 is applied to an analog/digital (A/D) converter 54, and is sequentially converted into digital R, G and B signals corresponding to the color filter array in the A/D converter 54. The converted digital R, G and B signals are temporarily preserved in the memory portion 56.

The memory portion 56 includes an SDRAM which is a volatile memory, an EEPROM (storage unit) which is a rewritable nonvolatile memory, and the like, and the SDRAM is used as a work area when the CPU 42 executes a process and as a storage area which temporarily holds a digital image signal acquired through imaging. On the other hand, the EEPROM stores a camera control program including an image processing program, pixel defect information of the imaging element 52, various parameters or tables used for image processes including mixed color correction, and the like.

An image processing portion 58 performs predetermined signal processes such as mixed color correction, white balance correction, a gamma correction process, a synchronization process (demosaic process), and RGB/YC conversion, on the digital image signal which is temporarily stored in the memory portion 56.

The image data having undergone the processes in the image processing portion 58 is encoded into data for image display in an encoder 60, and is output to a display portion 55 which is provided on a rear surface of the camera, via a driver 62. Consequently, subject images are continuously displayed on a display screen of the display portion 55.

When there is first-step pressing (half pressing) of a shutter button of the operation portion 44, the CPU 42 starts an automatic focusing (AF) operation and an automatic exposure (AE) operation, and performs control via the apparatus control portion 46 so that the focus lens of the lens portion 48 is moved in an optical axis direction, and thus the focus lens is located at a focus position.

The CPU 42 calculates brightness (photographing Ev value) of a subject on the basis of image data which is output from the A/D converter 54 during the half pressing of the shutter button, and determines exposure conditions (an F value and a shutter speed) according to the photographing Ev value.

When the AE operation and the AF operation are finished, and then there is second-step pressing (full pressing) of the shutter button, the diaphragm, the shutter 50, and electric charge accumulation time in the imaging element 52 are controlled on the basis of the determined exposure conditions, and thus main imaging is performed. During the main imaging, image data of an RGB mosaic image (an image corresponding to the color filter array illustrated in FIGS. 4 and 5), which is read from the imaging element 52 and is then A/D converted by the A/D converter 54, is temporarily stored in the memory portion 56.

The image data which is temporarily stored in the memory portion 56 is read by the image processing portion 58 as appropriate, and, here, undergoes predetermined signal processes including mixed color correction white balance correction, gamma correction, a synchronization process, and RGB/YC conversion. The RGB/YC converted image data (YC data) is compressed according to a predetermined compression format (for example, a JPEG method), and the compressed imaging data is recorded in an internal memory or an external memory in a predetermined image file (for example, an Exif file) format.

The imaging apparatus 40 may be provided with an optical low-pass filter (OLPF) 64 which optically cuts a high frequency component of light applied to the imaging element 52. For example, in a case of using the color filters with the Bayer type basic array illustrated in FIG. 4A, a high frequency component of an obtained image easily causes image deterioration such as moire. Therefore, in a case where imaging data (image data) is acquired by using the color filters with the Bayer array in which a high frequency component easily contributes to image deterioration, the image deterioration can be minimized by disposing the optical low-pass filter 64. On the other hand, in a case of using the color filters (X-Trans) with the basic array illustrated in FIG. 4B, image deterioration such as moire can be further reduced as described above, and thus imaging data with high resolution in which a high frequency component remains can be obtained without disposing the optical low-pass filter.

As mentioned above, whether or not the optical low-pass filter 64 is disposed can be appropriately determined on the basis of an apparatus configuration such as the type of imaging element (color filter) used in the imaging apparatus 40, and specific image processing content.

Next, a description will be made of specific processing content associated with the image enlargement process in the imaging apparatus 40 having the above-described apparatus configuration.

As described above with reference to FIG. 2A, in the image enlargement process, the image photographing data 30 which does not include enlarged image data is input to the image enlargement processing portion (image processing portion) 16, and the enlarged image data 38 is generated therein. The photographing condition data 34 including the enlarged image data 38 is output from the image enlargement processing portion 16.

Figure 6:
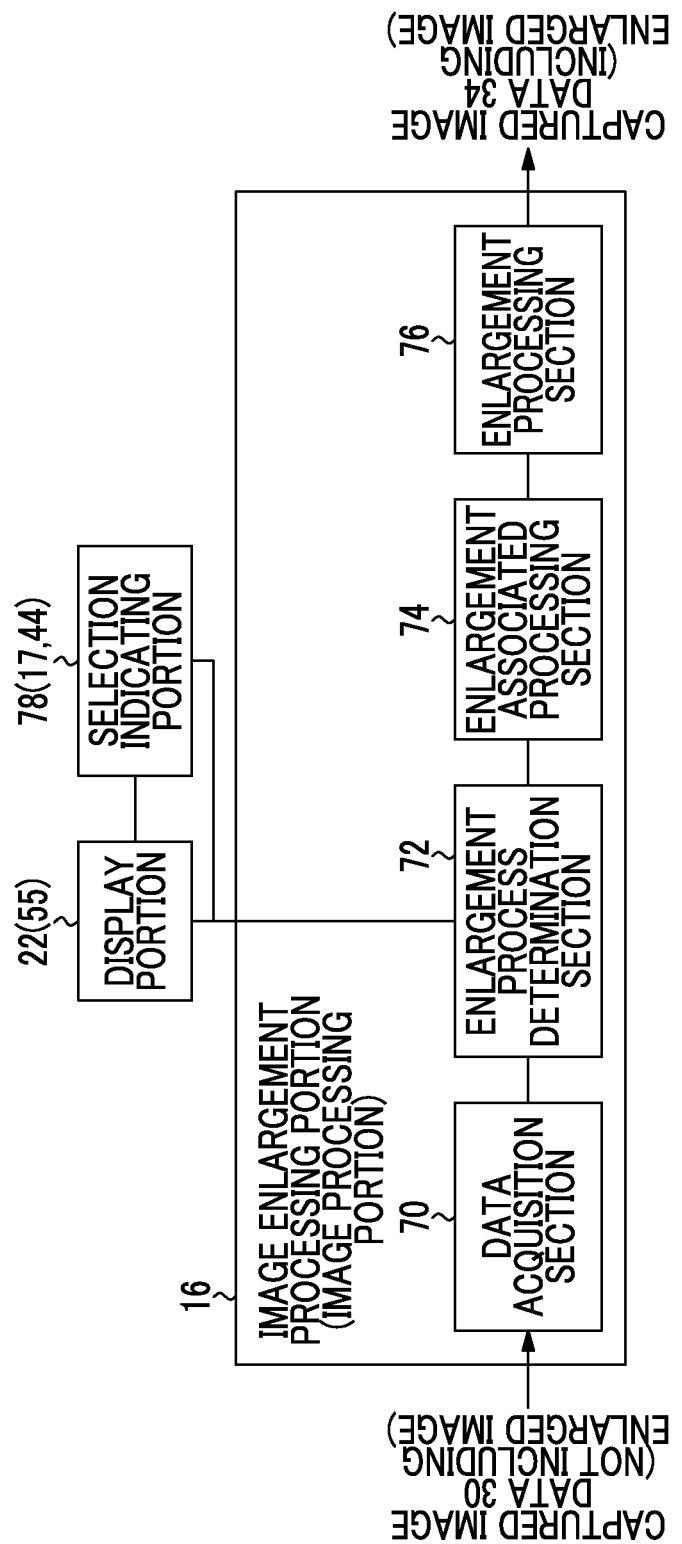
FIG. 6 is a functional block diagram associated with an image enlargement process which is mainly performed by the image enlargement processing portion.

FIG. 6 is a functional block diagram associated with the image enlargement process which is mainly performed by the image enlargement processing portion 16. The image enlargement processing portion 16 includes a data acquisition section (data acquisition unit) 70, an enlargement process determination section (enlargement process determination unit) 72, an enlargement associated processing section (enlargement process associated processing unit) 74, and an enlargement processing section (enlargement processing unit) 76.

The data acquisition section 70 judges whether or not the photographing condition data 34 is included in the input image photographing data 30 (refer to FIG. 2), and acquires content of the photographing condition data 34 if it is judged that the photographing condition data is included in the input image photographing data. The photographing condition data 34 acquired by the data acquisition section 70 may include overall data regarding information which may influence enlarged image data generated in the rear stage. Particularly, in this example, the photographing condition data 34 may include "information regarding the presence or absence of the optical low-pass filter 64 (refer to FIG. 3) during creation of the imaging data 32", "information regarding an array of color filters (refer to FIGS. 4 and 5) of the imaging element used to create the imaging data", and the like, which are used as determination references for the presence or absence or a level of a high frequency component which causes a difference in resolution or image deterioration such as moire in an enlarged image.

The enlargement process determination section 72 determines at least one of whether or not an enlargement associated process associated with an image enlargement process of the image photographing data 30 is executed, a process parameter for the enlargement associated process, and a process parameter for the image enlargement process, on the basis of the acquisition result of the photographing condition data 34 by the data acquisition section 70.

The "enlargement associated process" mentioned here may include all processes associated with the image enlargement process in the rear stage, and includes, for example, an enlargement preprocess of processing the image photographing data 30 prior to the image enlargement process. The enlargement preprocess may include, for example, a process for preventing a reduction in resolution or image deterioration in an enlarged image. Specifically, the enlargement associated process may be a process of emphasizing an image contour of the image photographing data 30 through a contour emphasis process or the like. Therefore, in a case where the enlargement associated process is a contour emphasis process, the enlargement process determination section 72 determines whether or not the contour emphasis process is executed and/or a process parameter for the contour emphasis process on the basis of the acquisition result of the photographing condition data 34 by the data acquisition section 70.

In addition, the determination in the enlargement process determination section 72 may be performed in an interaction form for prompting a user to make selection and determination (settlement), and may be performed without prompting the user to make selection and determination on the basis of a determination result from the data acquisition section 70. In a case of the interaction form with the user, for example, the enlargement process determination section 72 may display a determination result on the display portion 22 in a selectable manner. In this case, the user may select whether or not the determination result from the enlargement process determination section 72, displayed on the display portion 22, is settled, via the selection indicating portion 78.

In addition, the selection indicating portion 78 may have any configuration, and may be provided integrally with the display portion 22 and may be provided separately from the display portion 22. In a case where the selection indicating portion 78 is provided integrally with the display portion 22, such as a touch panel, the user can intuitively perform selection and determination or settlement and selection of a determination result presented on the display portion 22. Further, in a case where the selection indicating portion 78 is constituted by buttons and the like which are provided separately from the display portion 22, the user can perform selection and determination or settlement and selection by making display of a cursor or the like displayed on the display portion 22 correspond to a desired selection candidate with the selection indicating portion 78.

The enlargement process determination section 72 settles whether or not the enlargement associated process is executed, a process parameter for the enlargement associated process, and a process parameter for the image enlargement process, on the basis of a user's selection result regarding settlement of the determination result. Therefore, for example, in a case where a determination result in the enlargement process determination section 72, such as "execution of the enlargement associated process" is displayed on the display portion 22, if the user performs selection for settling the "execution of the enlargement associated process", the enlargement associated process is executed in the rear stage. However, if the user does not perform selection for settling the "execution of the enlargement associated process" (selection for refusing the "execution of the enlargement associated process" is performed, or "no execution of the enlargement associated process" is selected), the enlargement associated process is not executed in the rear stage.

In addition, a process parameter for the enlargement associated process and a process parameter for the image enlargement process, determined by the enlargement process determination section 72, may include a plurality of selection candidates displayed on the display portion 22, and, in this case, the display portion 22 may perform display so that the process parameter for the image enlargement process can be selected from among the plurality of selection candidates. The user may select a candidate employed as the process parameter from among the plurality of selection candidates, and the enlargement process determination section 72 may settle a process parameter for the enlargement associated process and a process parameter for the image enlargement process according to the user's selection.

When whether or not the enlargement associated process is executed, the process parameter for the enlargement associated process, and the process parameter for the image enlargement process are determined in the enlargement process determination section 72, the enlargement associated processing section 74 and the enlargement processing section 76 perform the enlargement associated process and the image enlargement process on the basis of the determination (settlement) in the enlargement process determination section 72.

The enlargement associated processing section 74 performs the enlargement associated process on the imaging data 32 according to the determination result from the enlargement process determination section 72. Particularly, in a case where whether or not the enlargement associated process is executed and a process parameter for the enlargement associated process are selected and settled by the user via the display portion 22 and the selection indicating portion 78, the enlargement associated processing section 74 performs the enlargement associated process on the imaging data 32 according to the settled execution or non-execution of the enlargement associated process and the settled process parameter for the enlargement associated process.

In addition, the enlargement associated process may not be executed. For example, in a case where "no execution of the enlargement associated process" is determined in the enlargement process determination section 72, the enlargement associated process is skipped in the enlargement associated processing section 74, and the image enlargement process is performed in the enlargement processing section 76 of the rear stage. Further, the enlargement associated processing section 74 may not be provided, and, in this case, the determination of whether or not the enlargement associated process is executed or a process parameter for the enlargement associated process is not performed in the enlargement process determination section 72.

Furthermore, the enlargement processing section 76 performs the image enlargement process on the imaging data 32 according to the determination result from the enlargement process determination section 72. In a case where a process parameter for the image enlargement process is selected and settled by the user via the display portion 22 and the selection indicating portion 78, the enlargement processing section 76 performs the image enlargement process on the imaging data 32 according to the settled process parameter for the image enlargement process.

As mentioned above, since the image enlargement process is performed by using the process parameter determined on the basis of the photographing condition data 34, image quality of an enlarged image obtained through the enlargement process can be optimized, and thus it is possible to prevent a reduction in resolution or image deterioration. Particularly, in a case where an enlargement associated process such as a contour emphasis process is performed according to a process parameter based on the photographing condition data 34, prior to the image enlargement process in the enlargement processing section 76, it is possible to further prevent a reduction in resolution or image deterioration.

In addition, in the above-described imaging apparatus 40 (refer to FIG. 3), the lens portion 48, the optical low-pass filter 64, the shutter 50, and the imaging element 52 function as the imaging portion 12, 12A or 12B of FIG. 1; the image processing portion 58 functions as the digital image processing portion 14, 14A or 14B and the image enlargement processing portion 16 of FIG. 1; the operation portion 44 functions as the user I/F 17 of FIG. 1; the CPU 42 functions as the input and output control portion 18 of FIG. 1; the encoder 60 and the driver 62 function as the input and output control portion 18 of FIG. 1; the memory portion 56 functions as the storage portion 20 of FIG. 1; and the display portion 55 functions as the display portion 22 of FIG. 1. Further, the selection indicating portion (selection unit) 78 of FIG. 6 corresponds to the user I/F 17 of FIG. 1 or the operation portion 44 of FIG. 3.

Next, a specific image enlargement process example will be described.

<First Embodiment>

Figure 7A:
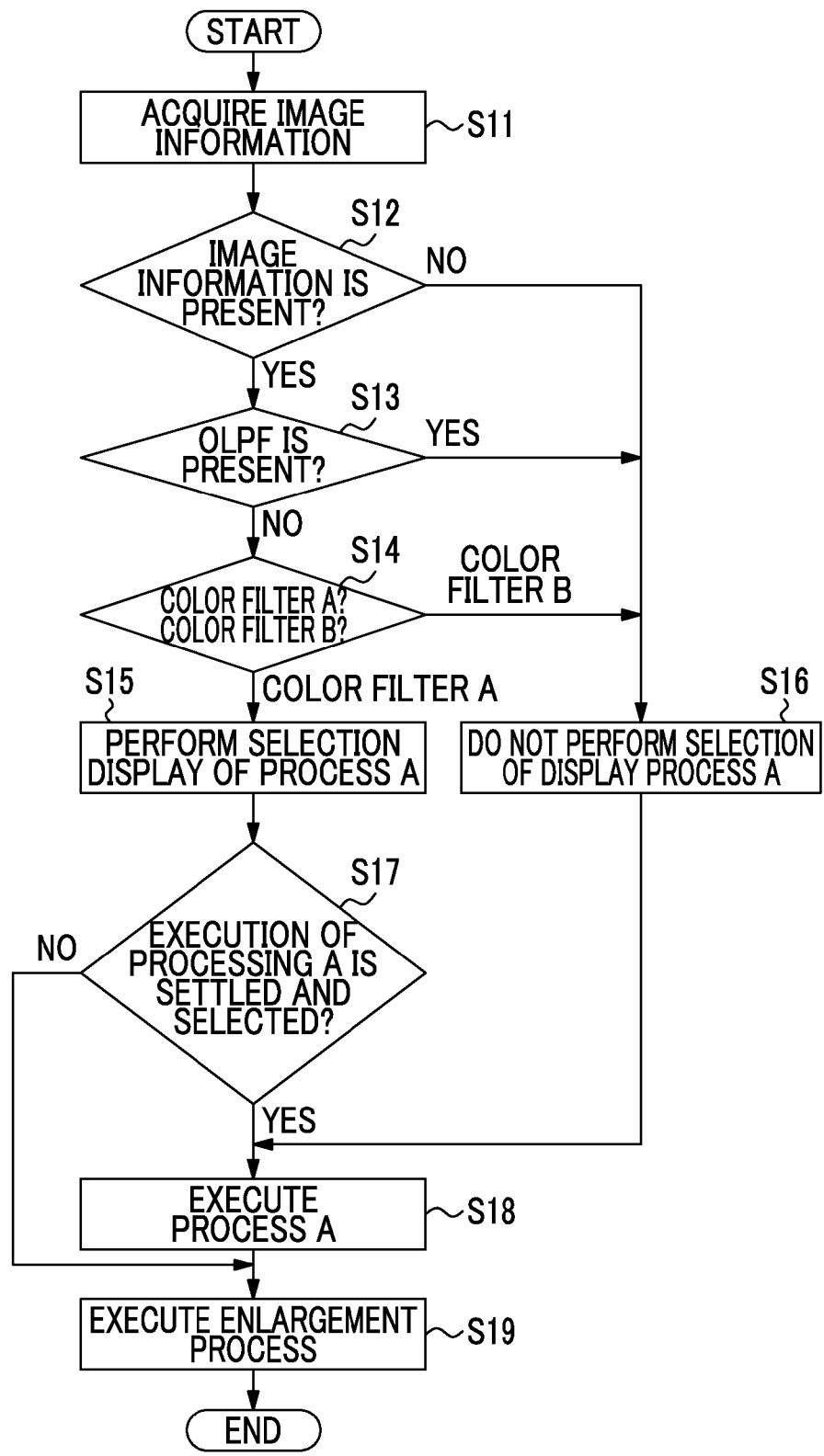
Figure 7B:
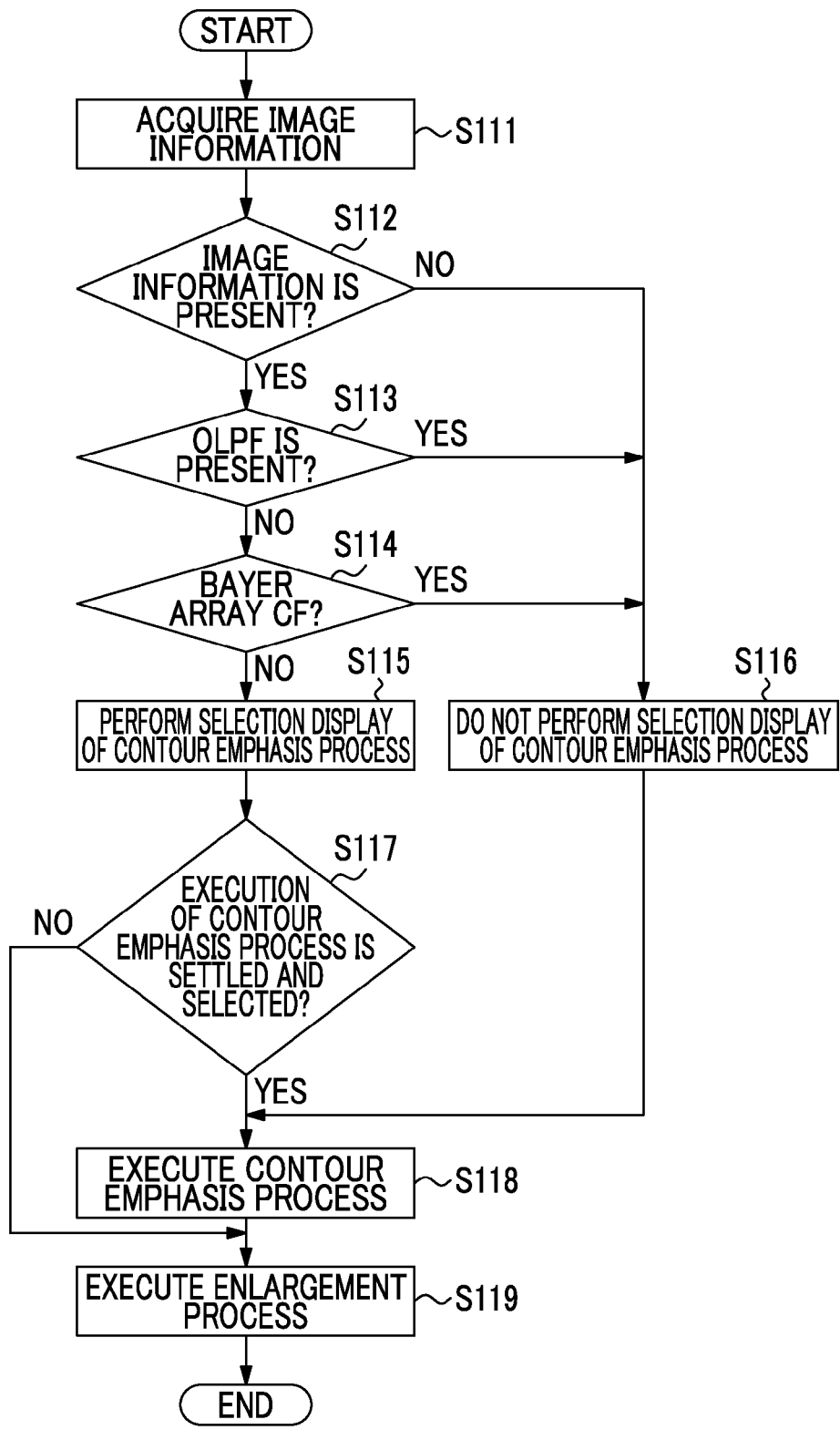

With reference to FIGS. 6 and 7, a description will be made of an image enlargement process example according to a first embodiment. FIGS. 7A and 7B are flowcharts illustrating flows of an image enlargement process of the first embodiment.

The present embodiment is applicable to, for example, a case where the image enlargement process is performed in a computer which is connected to an imaging unit (refer to FIG. 1C), and a case or the like is assumed in which a program (software) for executing the following image enlargement processes (including an enlargement associated process) is installed in the computer.

In the present embodiment, the presence or absence of selection display regarding the enlargement associated process (a process A or a contour emphasis process) is controlled depending on the presence or absence of photographing condition data, the presence or absence of an optical low-pass filter, and a color filter array.

In other words, if the image photographing data (not including enlarged image data) 30 is input to the image enlargement processing portion 16, the data acquisition section 70 acquires the photographing condition data 34 (step S11 of FIG. 7A). The data acquisition section 70 judges whether or not the photographing condition data 34 is included in the image photographing data 30, and acquires content of the photographing condition data 34 if it is judged that the photographing condition data is included in the input image photographing data (data acquisition step). In the present embodiment, "information regarding presence or absence of an optical low-pass filter" and "color filter array information" are used as the photographing condition data 34.

In addition, the enlargement process determination section 72 determines at least one of whether or not an enlargement associated process associated with an image enlargement process on the imaging data is executed, a process parameter for the enlargement associated process, and a process parameter for the image enlargement process, on the basis of the acquisition result of the photographing condition data by the data acquisition section 70 (enlargement process determination step).

In a case where it is judged that the photographing condition data 34 is not included in the image photographing data 30 (No in step S12) in the judgment of whether or not the photographing condition data 34 is included in the image photographing data 30 (step S12), the enlargement process determination section 72 does not perform selection display of the process A (enlargement associated process) on the display portion 22 (step S16).

On the other hand, in a case where it is judged that the photographing condition data 34 is included in the image photographing data 30 (Yes in step S12), the enlargement process determination section 72 judges whether or not the optical low-pass filter (OLPF) 64 is present (step S13) (refer to FIG. 3). In a case where it is judged that the optical low-pass filter 64 is used (Yes in step S13), the enlargement process determination section 72 does not perform selection display of the process A on the display portion 22 (step S16).

On the other hand, in a case where it is judged that the optical low-pass filter 64 is absent (No in step S13), the enlargement process determination section 72 judges a color filter (CF) array which is used, and judges which one of color filters A and color filters B is used in the color filter array (step S14). In a case where it is judged that the color filter array which is used is an array of the color filters B, the enlargement process determination section 72 does not perform selection display of the process A on the display portion 22 (step S16). On the other hand, in a case where it is judged that the color filter array which is used is an array of the color filters A, the enlargement process determination section 72 performs selection display of the process A on the display portion 22 (step S15).

In addition, the judgment (step S14) of a color filter may be performed on the basis of any method as necessary. For example, in a case where the types of color filters which are used are settled in advance, which color filter is used among the settled types may be directly judged. Thus, as described above, in a case where which one of the color filters A (for example, the X-Trans array color filter (FIGS. 4B and 5)) and the color filters B (for example, the Bayer array color filter (FIG. 4A)) is used is obvious, the color filters A or the color filters B may be directly detected. As such a case, for example, a case is expected in which an imaging portion including the color filters A and an imaging portion including the color filters B are mounted in the same device, and an image enlargement process is performed in the device. In addition, in a case where the type of color filter which is used is not necessarily settled, a color filter may be determined on the basis of whether or not the color filter has a high possibility of use. For example, in a case where a use possibility of the Bayer array color filter is high, it is judged whether or not a color filter which is used is the Bayer array color filter, and in a case of the Bayer array color filter, the color filter may be treated as the above-described "color filters B". In a case where the color filter is not the Bayer array color filter, the color filter may be treated as the above-described "color filters A". Similarly, in a case where a use possibility of the X-Trans array color filter is high, it is judged whether or not a color filter which is used is the X-Trans array color filter, and in a case of the X-Trans array color filter, the color filter may be treated as the above-described "color filters A". In a case where the color filter is not the Bayer array color filter, the color filter may be treated as the above-described "color filters B". As such a case, for example, a case is assumed in which a program (software), which is mainly aimed at performing an image enlargement process on imaging data which is acquired by a predetermined imaging device, is installed in a computer, and an enlargement associated process is performed in the computer.

The user operates the selection indicating portion 78 on the basis of the selection display of the process A on the display portion 22 and can thus settle and select execution of the process A.

In addition, a method of selection display on the display portion 22 is not particularly limited. For example, there may be a form in which a notification is sent to the user as a warning; there may be a form in which a determination result from the enlargement process determination section 72 is displayed, and the user is asked about whether or not the determination result is permitted; and there may be a form in which a determination result from the enlargement process determination section 72 and an option opposite to the determination result are displayed, and the user selects one of the two.

The enlargement process determination section 72 judges whether or not the user selects and settles execution of the process A (step S17). In a case where it is judged that the user selects and settles execution of the process A (Yes in step S17), the process A is executed in the enlargement associated processing section 74 (step S18), and then an image enlargement process is performed in the enlargement processing section 76 (step S19).

On the other hand, in a case where execution of the process A is not selected (in a case where non-execution of the process A is selected and settled) (No in step S17), the process A is skipped, and an image enlargement process is performed in the enlargement processing section 76 in a state in which the process A is not performed (step S19).

In addition, if selection display of the process A is not performed on the display portion 22 (step S16), selection and settlement of the process A is not performed by the user so that the process A is forced to be executed in the enlargement associated processing section 74 (step S18), and then an image enlargement process is performed in the enlargement processing section 76 (step S19), in the same manner as in a case where it is judged that there is no photographing condition data 34 (No in step S12), in a case where it is judged that the optical low-pass filter is present (No in step S13) and it is judged that a color filter array is an array of the color filters B (step S14).

FIG. 7B is a flowchart in a case where a contour emphasis process is employed as the process A (enlargement associated process) in the process flow of FIG. 7A. Steps S111 to S119 of FIG. 7B are the same as steps S11 to S19 of FIG. 7A except that "a judgment of a color filter array (step S14 of FIG. 7A)" is replaced with "a judgment of a Bayer array (step S114 of FIG. 7B)", and the "process A" is replaced with the "contour emphasis process".

In other words, in a case where it is judged that the photographing condition data 34 is included in the input image photographing data 30 (Yes in step S112), it is judged that the optical low-pass filter 64 is not present (No in step S1B), and it is judged that a color filter array which is used is not the Bayer array (that is, a color filter array is the color filter array illustrated in FIGS. 4B and 5) (No in step S114), selection display of the contour emphasis process is performed on the display portion 22 (step S115). In addition, it is judged whether or not execution of the contour emphasis process is selected and settled by the user (step S117). In a case where execution of the contour emphasis process is selected and settled by the user (Yes in step S117), the contour emphasis process is executed in the enlargement associated processing section 74 (step S118), and an image enlargement process is performed in the enlargement processing section 76 (step S119). On the other hand, in a case where execution of the contour emphasis process is not selected by the user (No in step S117), the image enlargement process is performed in the enlargement processing section 76 in a state in which the contour emphasis process is not performed (step S119). In addition, in a case where it is judged that the photographing condition data 34 is not present (No in step S112), it is judged that the optical low-pass filter is present (Yes in step S113), or it is judged that a color filter array which is used is the Bayer array (Yes in step S114), selection display of the contour emphasis process is not performed on the display portion 22 (step S116), selection and settlement of the contour emphasis process are not performed by the user, the contour emphasis process is forced to be executed (step S118), and then the image enlargement process is performed (step S119).

According to the process flows of FIGS. 7A and 7B, in a case where the photographing condition data 34 is not present (No in steps S12 and S112), in a case where photographing is performed and image resolution of the imaging data 32 is reduced in a state in which the optical low-pass filter is present (Yes in steps S13 and S113), or in a case where a color filter array is the Bayer array (Yes in steps S14 and S114), selection display for the user is not performed (steps S16 and S116), and the enlargement associated process (the process A or the contour emphasis process) is forced to be executed (steps S18 and S118) prior to the enlargement process (step S19).

For example, if an image enlargement process is performed without performing an enlargement associated process in a case where an optical low-pass filter (OLPF) is used during photographing, and there is image information such as "presence of the optical low-pass filter during photographing", there is a high possibility that resolution of an enlarged image may be reduced. However, according to the image enlargement process flow (FIG. 7B) according to the present embodiment described above, in a case where there is image information such as "presence of the optical low-pass filter during photographing", selection display of a contour emphasis process for the user is set not to be performed, and the contour emphasis process is forced to be executed prior to an enlargement process. Therefore, it is possible to further minimize a reduction in resolution of an enlarged image.

In addition, in a case where color filters used in the imaging portion have the Bayer array, since there is a high possibility that resolution of an enlarged image may be reduced when compared with the color filters illustrated in FIGS. 4B and 5, selection display of a contour emphasis process for the user is set not to be performed, and the contour emphasis process is forced to be executed prior to an enlargement process. Therefore, it is possible to further minimize a reduction in resolution of an enlarged image.

On the other hand, in a case where photographing is performed in a state in which an optical low-pass filter is not present and the imaging data 32 containing a high frequency component which influences resolution is obtained (No in steps S13 and S113), and in a case where the color filters, illustrated in FIG. 4B or FIG. 5, very suitable for acquiring a high resolution image, are used (No in steps S14 and S114), the user is asked about whether or not an enlargement associated process (the process A or a contour emphasis process) is executed via the display portion 22, and the enlargement associated process is executed (Yes in steps S17 and S117) or is not executed (No in steps S17 and S117) according to selection and settlement results from the user via the selection indicating portion 78.

Figure 8:
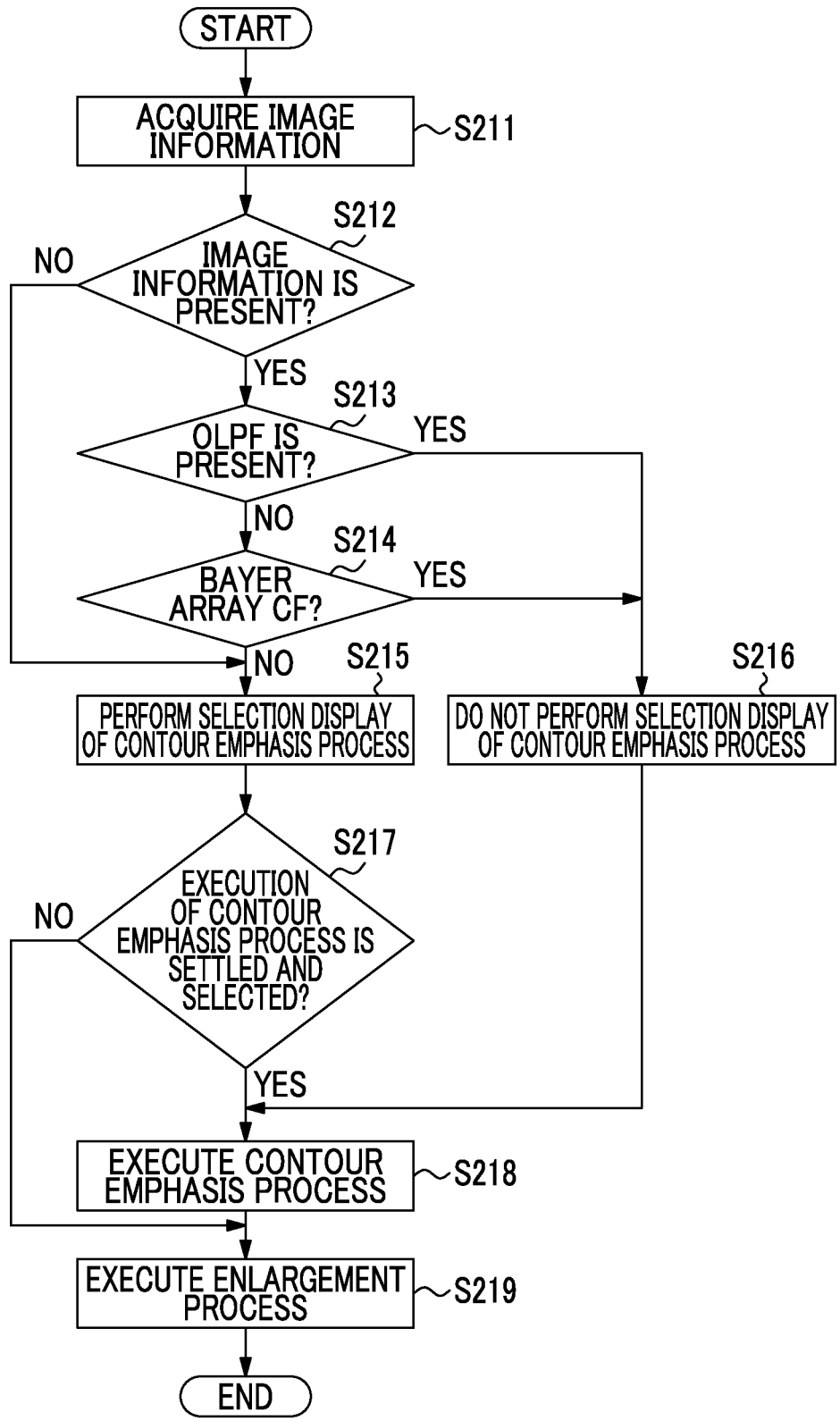
FIG. 8 is a flowchart illustrating a modification example of the first embodiment.

In addition, in the above-described embodiment, a description has been made of the example in which selection display of the contour emphasis process (the process A) is not performed on the display portion 22 in a case where it is judged that the photographing condition data 34 is not included in the image photographing data 30 (No in steps S12 and S112), but the selection display of the contour emphasis process (the process A) may be performed on the display portion 22. FIG. 8 is a flowchart illustrating a modification example of the above-described first embodiment. The flowchart is the same as the above-described flowchart illustrated in FIG. 7B except that selection display of the contour emphasis process (the process A) is performed on the display portion 22 (step S215 of FIG. 8) in a case where it is judged that the photographing condition data 34 is not included in the image photographing data 30 (No in steps S12 and S112).

As described above, according to the present embodiment (the modification example), a settable range and/or process selection content can be optimized by using the display portion 22 and the selection indicating portion 78 in accordance with the presence or absence of an optical low-pass filter and an array pattern of color filters, and thus the user can select any process which is the optimum for generation of the enlarged image data 38 based on the imaging data 32. Thus, minimization of a reduction in resolution and image deterioration in an enlarged image, and a flexible enlargement associated process and an enlargement process corresponding to a user's request can be realized in a very high level.

In addition, in the above-described embodiment (modification example), a description has been made of the example in which both the judgment (steps S13, S113 and S213) of the presence or absence of an optical low-pass filter and the judgment of an array pattern of color filters (steps S14, S114 and S214) are performed, but either of the two determinations may be performed. For example, in a case where only the presence or absence of an optical low-pass filter is judged, the "judgment of whether color filters (CFs) which are used are the color filters A or the color filters B (step S14 of FIG. 7A) and have the Bayer array (step S114 of FIG. 7B and step S214 of FIG. 8)" is not performed, and, in a case where it is judged that an optical low-pass filter is used, the enlargement process determination section 72 performs selection display of the process A/the contour emphasis process on the display portion 22 (steps S15, S115 and S215). On the other hand, in a case where only the judgment of an array pattern of color filters is performed, the "a judgment of the presence or absence of an optical low-pass filter (steps S13, S113 and S213)" is not performed. If it is judged that the photographing condition data 34 is included in the image photographing data 30 (Yes in steps S12 and S112), the enlargement process determination section 72 performs the judgment of whether color filters (CFs) which are used are the color filters A or the color filters B (step S14 of FIG. 7A) and have the Bayer array (step S114 of FIG. 7B and step S214 of FIG. 8) (steps S14 and S114).

In addition, in the embodiment shown in FIGS. 7A and 7B, a description has been made of the example in which if selection display of the process A is not performed on the display portion 22 (steps S16 and S116), the enlargement associated process (the process A or the contour emphasis process) is forced to be executed in the enlargement associated processing section 74 (steps S18 and S118), in the same manner as in a case where it is judged that there is no photographing condition data 34 (No in steps S12 and S112), in a case where it is judged that the optical low-pass filter is present (Yes in steps S13 and S113) and it is judged that a color filter array is an array of the color filters B/the Bayer array (Yes in steps S14 and S114). However, in this case, the enlargement associated process may be forced not to be executed.

<Second Embodiment>

Figure 9A:
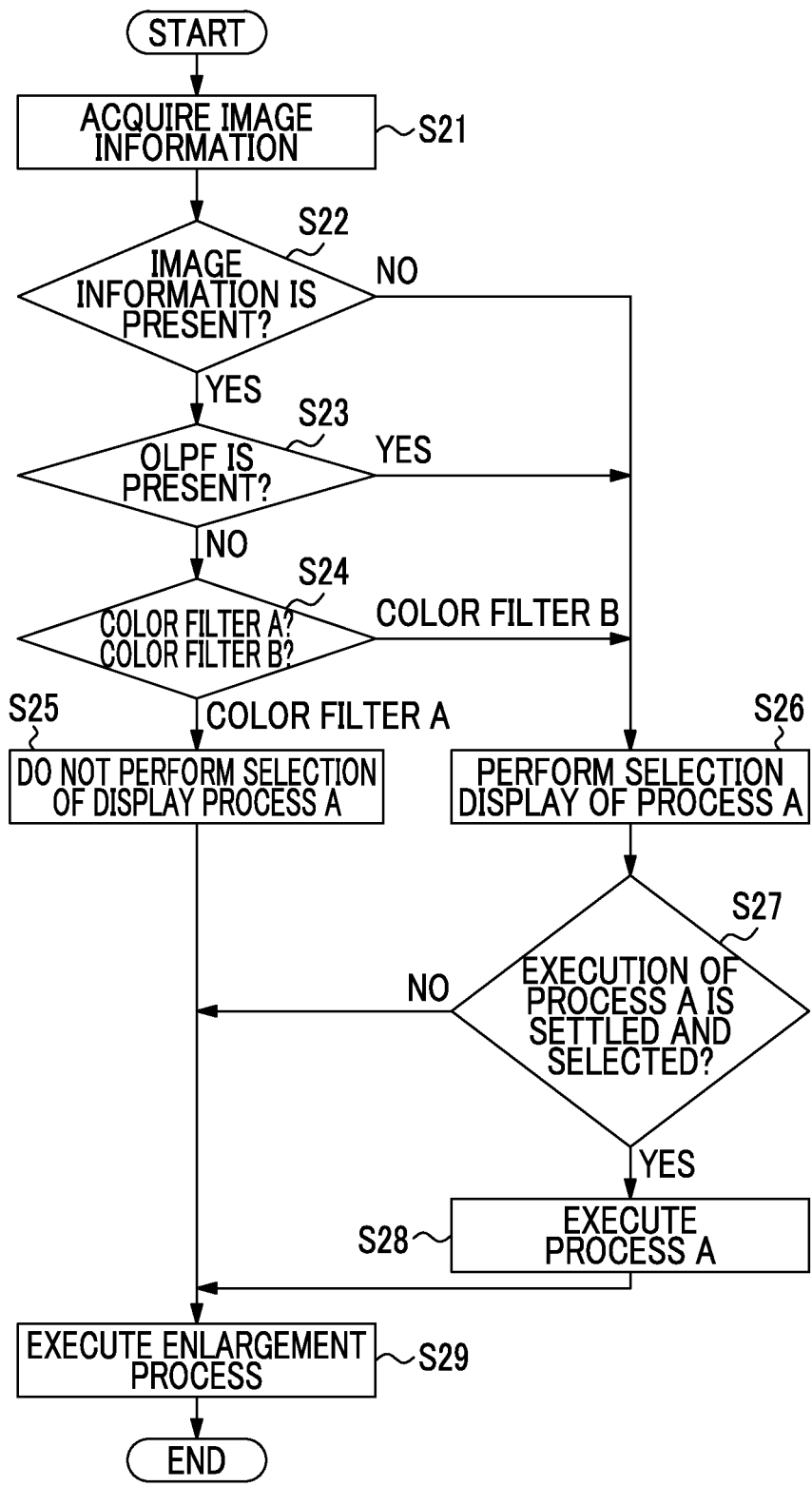

With reference to FIGS. 6 and 9, a description will be made of an image enlargement process example according to a second embodiment. FIG. 9A is a flowchart illustrating a flow of an enlargement process of the second embodiment.

In the present embodiment, detailed description of processes which are the same as or similar to those of the above-described first embodiment will be omitted.

Also in the present embodiment, the presence or absence of selection display regarding the enlargement associated process (a process A or a contour emphasis process) is controlled depending on the presence or absence of photographing condition data, the presence or absence of an optical low-pass filter, and a color filter array.

In other words, in the same manner as in the first embodiment, if the image photographing data (not including enlarged image data) 30 is input to the image enlargement processing portion 16, the data acquisition section 70 acquires the photographing condition data 34 (step S21 of FIG. 9A). In addition, the present embodiment is the same as the first embodiment (refer to steps S12 to S14 of FIG. 7A) in that the enlargement process determination section 72 judges whether or not photographing condition data is included in the image photographing data 30 (step S22), judges whether or not the optical low-pass filter (OLPF) 64 is present (step S23), and determines whether color filters (CFs) which are used are the color filters A or the color filters B (step S24).

However, in the present embodiment, in a case where the photographing condition data 34 is included in the image photographing data 30 (Yes in step S22), the optical low-pass filter 64 is not used (No in step S23), and the color filter which is used is the color filters A (step S24), the enlargement process determination section 72 does not perform selection display of the process A on the display portion 22 (step S25), the process A is forced to be skipped, and an image enlargement process is performed in the enlargement processing section 76 in a state in which the process A is not performed (step S29).

On the other hand, in a case where the photographing condition data is not included in the image photographing data 30 (No in step S22), the optical low-pass filter 64 is used (Yes in step S23), or it is judged that the color filter which is used is the color filters B (step S24), the enlargement process determination section 72 performs selection display of the process A on the display portion 22 (step S26). The user operates the selection indicating portion 78 on the basis of the selection display of the process A on the display portion 22 and can thus settle and select execution of the process A.

In addition, the enlargement process determination section 72 judges whether or not the user selects and settles execution of the process A (step S27). In a case where it is judged that the user selects and settles execution of the process A (Yes in step S27), the process A is executed in the enlargement associated processing section 74 (step S28), and then an image enlargement process is performed in the enlargement processing section 76 (step S29).

On the other hand, in a case where execution of the process A is not selected (in a case where non-execution of the process A is selected and settled) (No in step S27), the process A is skipped, and an image enlargement process is performed in the enlargement processing section 76 in a state in which the process A is not performed (step S29).

Figure 9B:
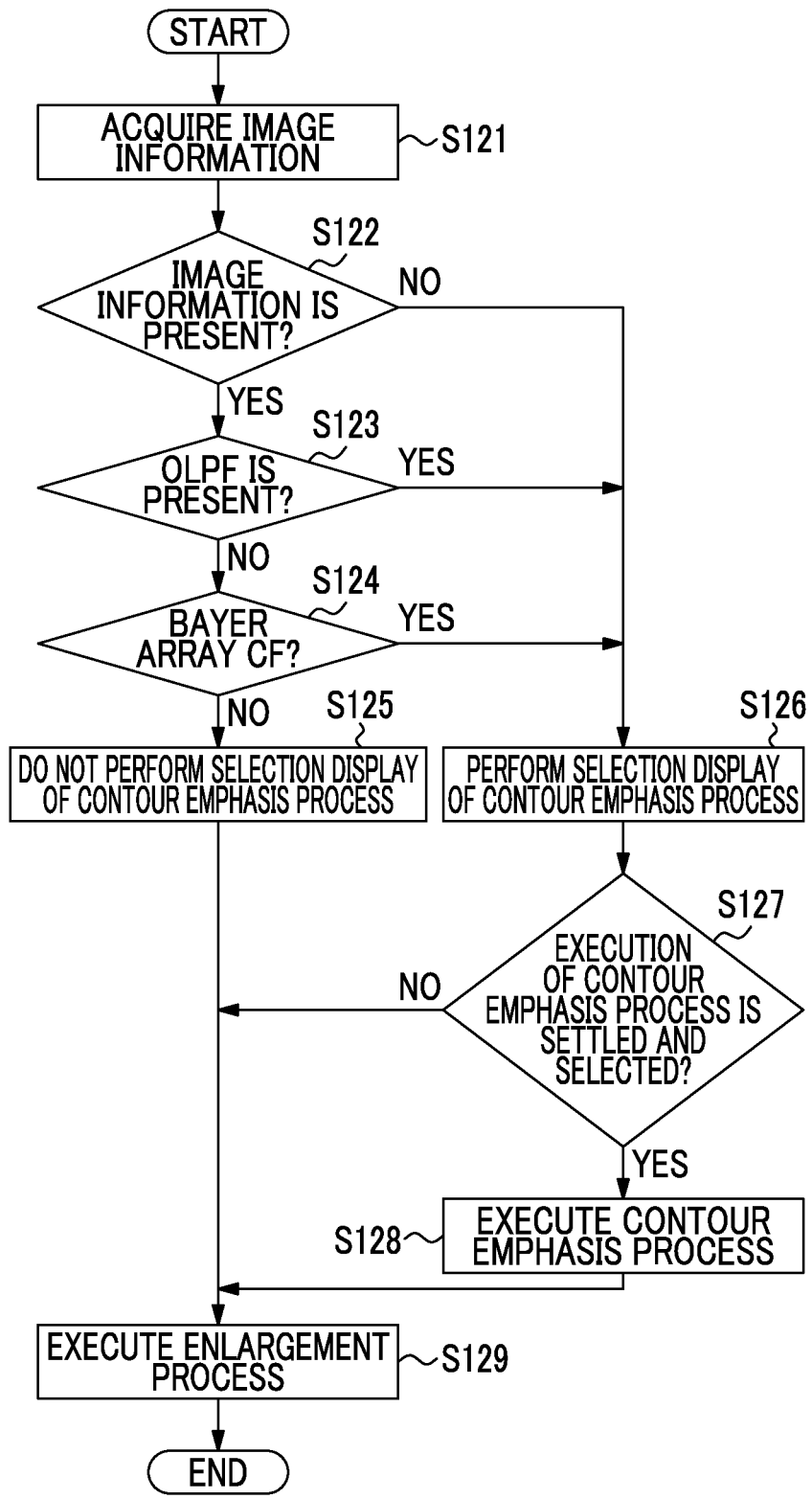

FIG. 9B is a flowchart in a case where a contour emphasis process is employed as the process A (enlargement associated process) in the process flow of FIG. 9A. Steps S121 to S129 of FIG. 9B are the same as steps S21 to S29 of FIG. 9A except that "a judgment of a color filter array (step S24 of FIG. 9A)" is replaced with "a judgment of a Bayer array (step S124 of FIG. 7B)", and the "process A" is replaced with the "contour emphasis process".

In other words, in a case where it is judged that the photographing condition data 34 is included in the input image photographing data 30 (Yes in step S122), it is judged that the optical low-pass filter is not present (No in step S123), and it is judged that a color filter array which is used is not the Bayer array (that is, a color filter array is the color filter array illustrated in FIGS. 4B and 5) (No in step S124), selection display of the contour emphasis process is not performed on the display portion 22 (step S125), and an image enlargement process is performed (step S129). On the other hand, in a case where it is judged that the photographing condition data 34 is not present (No in step S122), it is judged that the optical low-pass filter 64 is present (Yes in step S123), or it is judged that a color filter array which is used is the Bayer array (Yes in step S124), selection display of the contour emphasis process is performed on the display portion 22 (step S126). In addition, it is judged whether or not execution of the contour emphasis process is selected and settled by the user (step S127). In a case where execution of the contour emphasis process is selected and settled by the user (Yes in step S127), the contour emphasis process is executed in the enlargement associated processing section 74 (step S128), and an image enlargement process is performed in the enlargement processing section 76 (step S129). On the other hand, in a case where execution of the contour emphasis process is not selected by the user (No in step S127), the image enlargement process is performed in the enlargement processing section 76 in a state in which the contour emphasis process is not performed (step S129).

As mentioned above, also in the present embodiment, minimization of a reduction in resolution and image deterioration in an enlarged image, and flexible enlargement associated process and enlargement process corresponding to a user's request can be realized in a very high level.

<Third Embodiment>

Figure 10A:
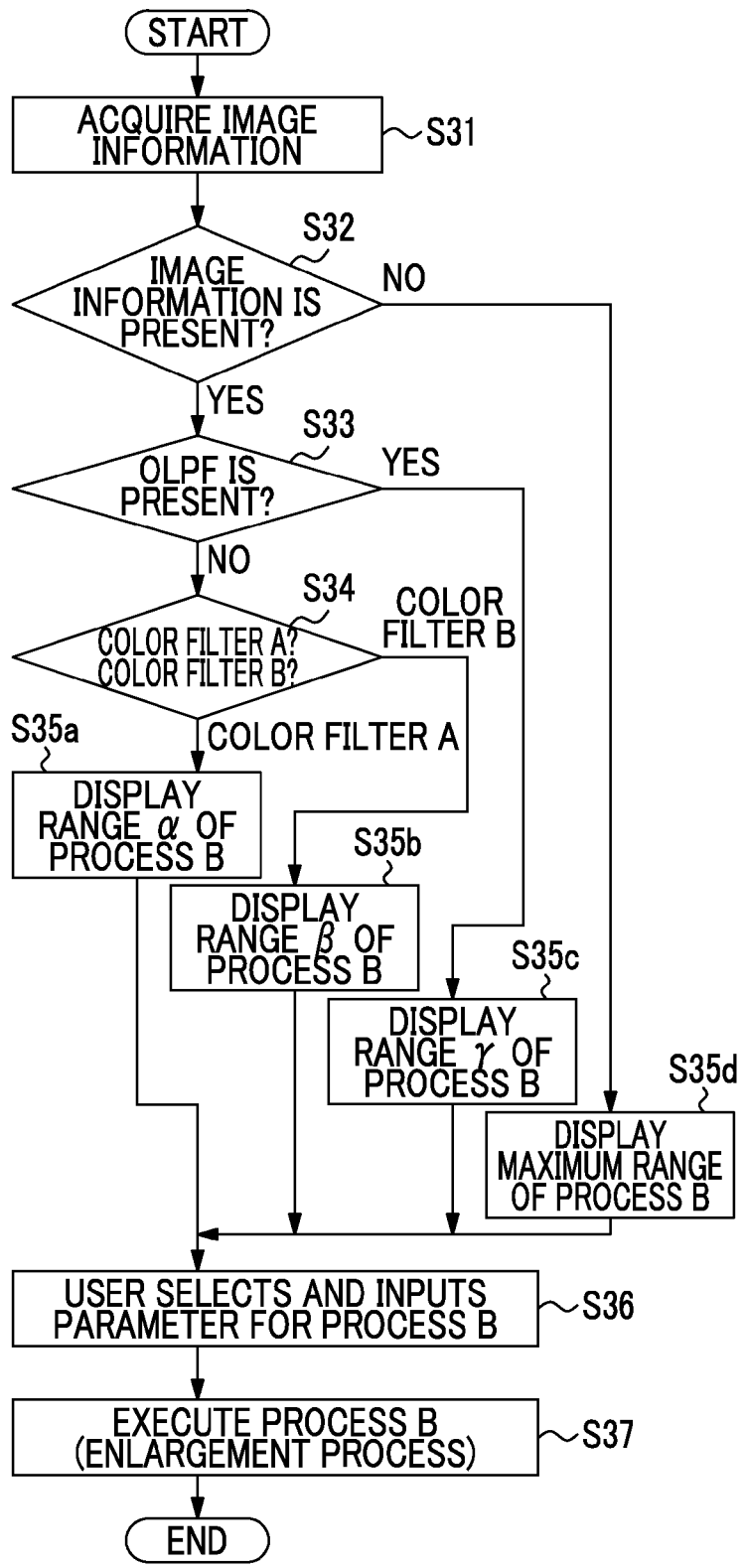

With reference to FIGS. 6 and 10, a description will be made of an image enlargement process example according to a third embodiment. FIG. 10A is a flowchart illustrating a flow of an enlargement process of the third embodiment.

In the present embodiment, detailed description of processes which are the same as or similar to those of the above-described first embodiment will be omitted.

In the present embodiment, a parameter range of a process (the process B or an interpolation process) in an enlargement process is controlled depending on the presence or absence of photographing condition data, the presence or absence of an optical low-pass filter, and a color filter array.

Also in the present embodiment, in the same manner as in the first embodiment, if the image photographing data (not including enlarged image data) 30 is input to the image enlargement processing portion 16, the data acquisition section 70 acquires the photographing condition data 34 (step S31 of FIG. 10A). In addition, the present embodiment is the same as the first embodiment (refer to steps S12 to S14 of FIG. 7A) in that the enlargement process determination section 72 judges whether or not photographing condition data is included in the image photographing data 30 (step S32), judges whether or not the optical low-pass filter (OLPF) 64 is present (step S33), and determines whether color filters (CFs) which are used are the color filters A or the color filters B (step S34).

However, in the present embodiment, a parameter selectable range (a range including a plurality of selection candidates) for the process B (interpolation process) in an enlargement process may be determined on the basis of a judgment of the presence or absence of the photographing condition data 34, the presence or absence of the optical low-pass filter 64, and whether use color filters have the color filters A or the color filters B.

For example, in a case where it is judged that photographing condition data is not included in the image photographing data 30 (No in step S32), the enlargement process determination section 72 displays the "maximum range" on the display portion 22 as a selectable range of a process parameter for the process B (step S35d). In addition, in a case where it is judged that the photographing condition data is included in the image photographing data 30 (Yes in step S32), and the optical low-pass filter 64 is used (Yes in step S33), the enlargement process determination section 72 displays a "range γ" on the display portion 22 as a selectable range of a process parameter for the process B (step S35c). Further, in a case where it is judged that the optical low-pass filter 64 is not used (No in step S33), and a use color filter is the color filters B (step S34), the enlargement process determination section 72 displays a "range β" on the display portion 22 as a selectable range of a process parameter for the process B (step S35b). On the other hand, in a case where it is judged that a use color filter is the color filters A (step S34), the enlargement process determination section 72 displays a "range α" on the display portion 22 as a selectable range of a process parameter for the process B (step S35a).

The user may select any parameter from among selection candidates included in the selectable ranges (α, β, γ, and the maximum range) determined in the above-described manner, via the selection indicating portion 78. If selection of a parameter for the process B is input by the user via the selection indicating portion 78 (step S36), the enlargement processing section 76 performs the process B on the basis of the parameter which is selected and input by the user (step S37).

Figure 10B:
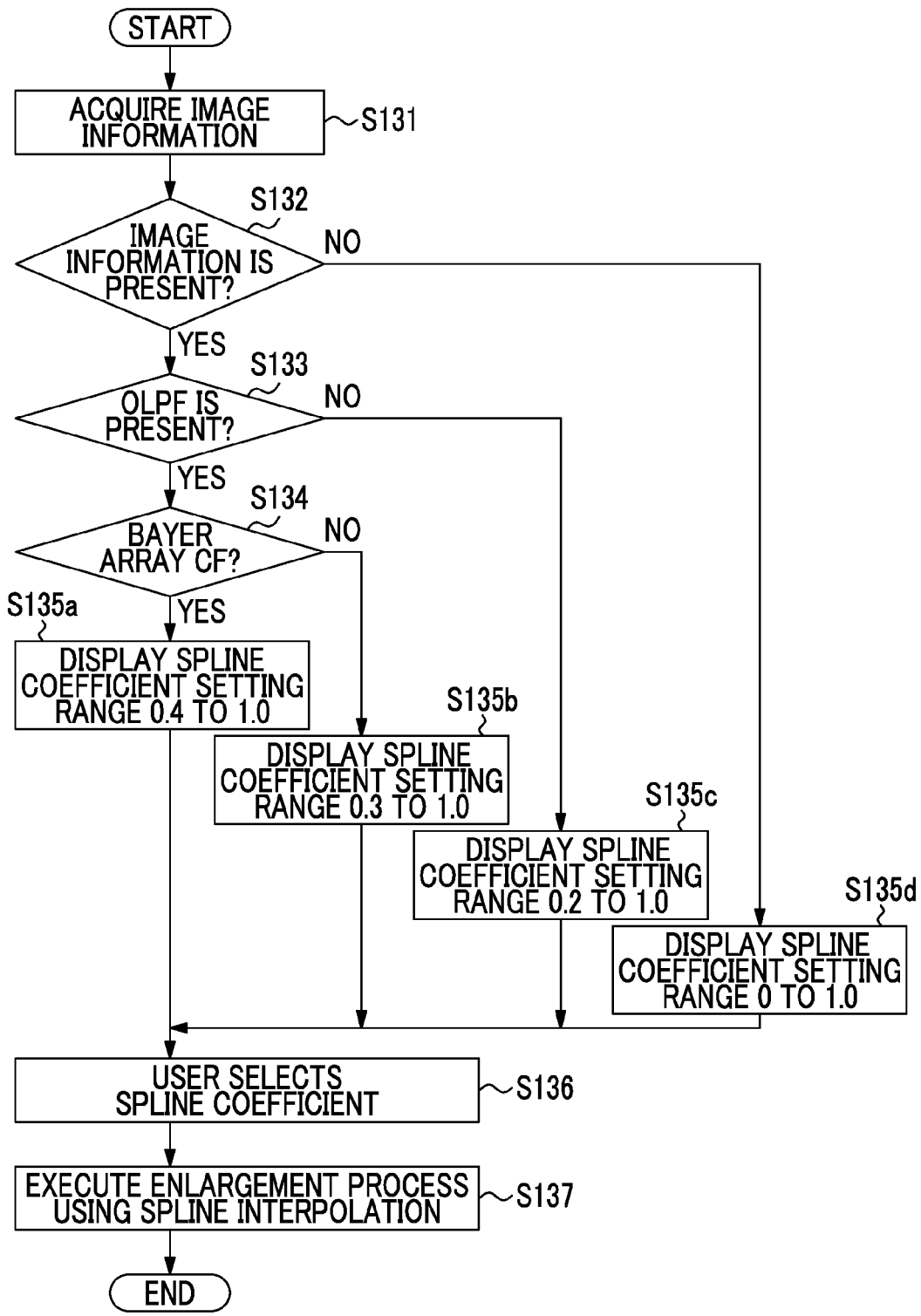

FIG. 10B illustrates an example of a flowchart in a case where "a judgment of the Bayer array" (step S134 of FIG. 10B) is employed as the judgment of a color filter array (step S34 of FIG. 10A) in the process flow of FIG. 10A, and a "spline interpolation process in an enlargement process" is employed as the process B.

In an example illustrated in FIG. 10B, the photographing condition data 34 is acquired in the data acquisition section 70 (step S131 of FIG. 10B), and in a case where it is judged that photographing condition data is not included in the image photographing data 30 (No in step S132), the enlargement process determination section 72 sets 0 to 1.0 which is the maximum range of a spline interpolation coefficient as a settable range (step S135d).

In addition, in a case where there is information such as "absence of an optical low-pass filter" during photographing (No in step S133), the enlargement process determination section 72 narrows a spline interpolation coefficient settable range and sets the spline interpolation coefficient settable range to 0.2 to 1.0 (step S135c).

This is because resolution of imaging data acquired without using an optical low-pass filter is high, and a noticeable reduction in resolution scarcely occurs even if an image enlargement process is performed in that state. In the spline interpolation, the greater the spline interpolation coefficient, the higher the image sharpness. On the contrary, if the spline interpolation coefficient is too small, there is a possibility that resolution may be reduced. The resolution of imaging data acquired by using an optical low-pass filter is slightly reduced, but, in a case where the optical low-pass filter is not used, imaging data with relatively high resolution can be reduced, and a degree of reduction in resolution in an enlarged image is relatively low. Therefore, the spline interpolation coefficient settable range can be set to 0.2 to 1.0 for imaging data which is acquired without using an optical low-pass filter.

On the other hand, in a case where there is information such as "presence of an optical low-pass filter" during photographing (Yes in step S133), the enlargement process determination section 72 judges whether or not an array pattern of use color filter is a Bayer array (step S134). In a case where an array pattern (the array pattern or the like illustrated in FIGS. 4B and 5) of the use color filter is a pattern other than the Bayer array (No in step S134), the enlargement process determination section 72 sets a spline interpolation coefficient settable range to 0.3 to 1.0 (step S135b). On the other hand, in a case where an array pattern of the color filter is the Bayer array (Yes in step S134), the enlargement process determination section 72 sets a spline interpolation coefficient settable range to 0.4 to 1.0 (step S135a). This is because a high frequency component is removed and thus a reduction in resolution more easily occurs in the imaging data 32 obtained by using the Bayer array color filters than by using the color filters of FIGS. 4B and 5.

Next, a description will be made of an example of the above-described third embodiment with reference to a flowchart illustrated in FIG. 11.

In the present modification example, in a case where it is obvious that imaging data is acquired under a condition in which resolution of image data is not reduced even if an image enlargement process is performed, a spline interpolation coefficient settable range is made to be flexible, and a range of 0.2 to 1.0 is set as the spline interpolation coefficient settable range (step S235c), in the same manner as in a case where "an optical low-pass filter is not used (No in step S233a of FIG. 11)" and "the color filters (X-Trans array) of FIGS. 4B and 5 which allow high resolution imaging data to be acquired are used (Yes in step S233b)". On the other hand, in a case where "an optical low-pass filter is not used (No in step S233a of FIG. 11)" and "not the color filters (X-Trans array) of FIGS. 4B and 5 but other color filters having the Bayer array illustrated in FIG. 4A are used (No in step S233b)", there is a high possibility that a reduction in resolution of an enlarged image may not be visible, but there is a possibility that image deterioration such as color moire may be visible. Therefore, a range of 0.3 to 1.0 is set as a spline interpolation coefficient settable range (step S235b).

In addition, in a case where the optical low-pass filter is used (Yes in step S233a), and the color filters (X-Trans array) of FIGS. 4B and 5 are used (Yes in step S234), similarly, a range of 0.3 to 1.0 is set as a spline interpolation coefficient settable range (step S235b). On the other hand, in a case where the optical low-pass filter is used (Yes in step S233a), and not the color filters (X-Trans array) of FIGS. 4B and 5 but other color filters having the Bayer array illustrated in FIG. 4A are used (No in step S234b), a range of 0.4 to 1.0 is set as a spline interpolation coefficient settable range (step S235a). Other process steps are the same as the process steps in FIG. 10B described above.

Figure 11:
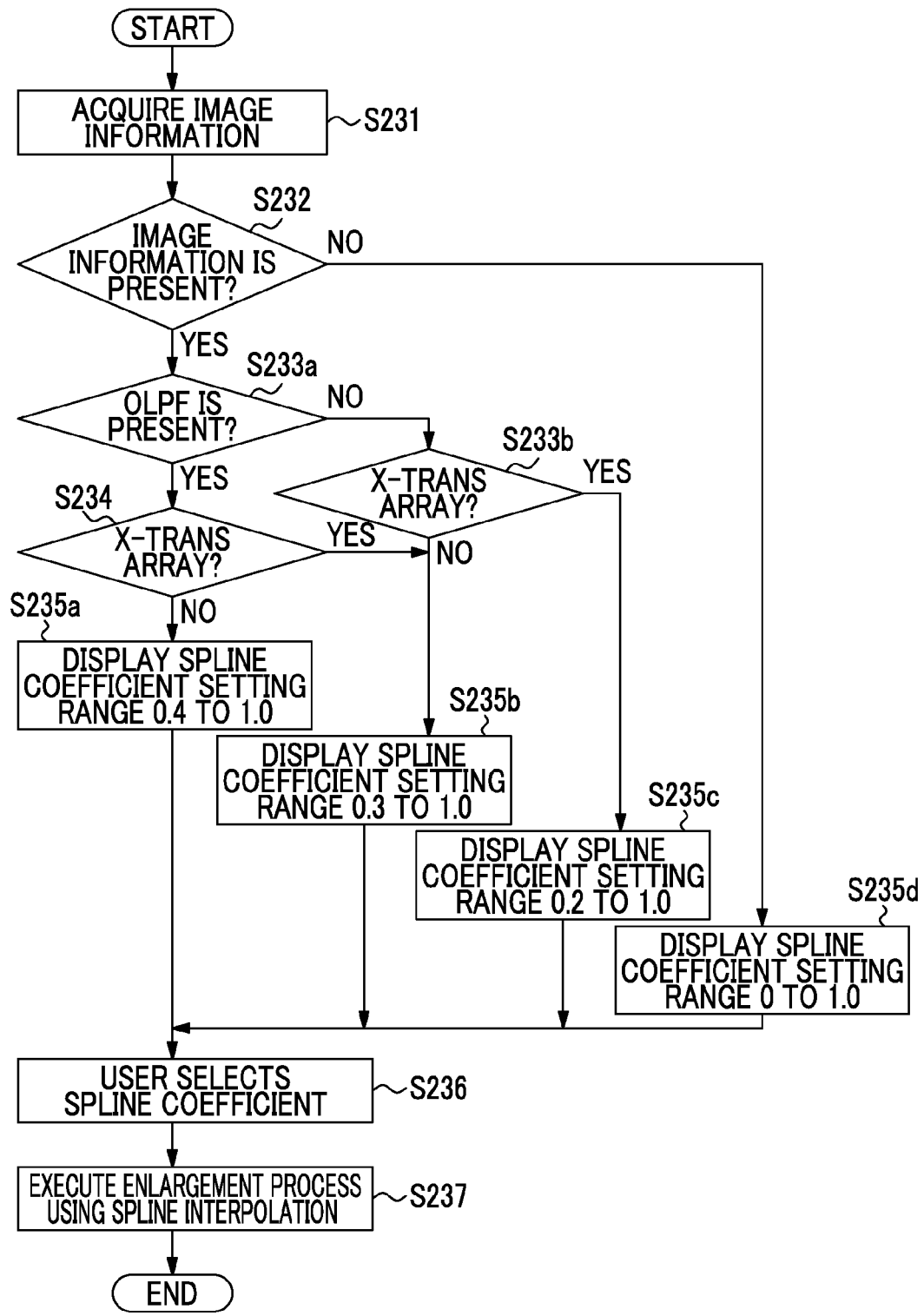
FIG. 11 is a flowchart illustrating a modification example of the third embodiment.

According to the modification example illustrated in FIG. 11, in a case where it is obvious that imaging data has high resolution, and a degree of reduction in resolution is low during enlargement of an image, an enlargement process (setting of a spline interpolation coefficient) is performed in consideration of such image characteristics, and thus enlarged image data with a high magnification can be obtained.

In addition, the numerical values of a spline interpolation coefficient settable range as illustrated in FIGS. 10B and 11 are only an example, and the spline interpolation coefficient settable range may be set to other numerical values. For example, a spline interpolation coefficient settable range in each case may be determined by using other values which do not cause a magnitude relationship between numerical values to vary.

Further, an interpolation process which can be used for an enlargement process is not limited to the spline interpolation process, and may use any interpolation process. For example, a nearest neighbor method, a bi-linear interpolation method, a bi-cubic convolution interpolation method, or the like having characteristics shown in the following table may be used instead of the spline interpolation method, and a setting range of a process parameter in each interpolation method may be displayed and selected instead of the spline interpolation coefficient settable range.

TABLE 1

| Interpolation method in resize (reduction) | Image quality (degree of occurrence of moire or the like) | Amount of calculation |
| --- | --- | --- |
| Nearest neighbor method | Bad | Small |
| Bi-linear method | Not bad | Intermediate |
| Bi-cubic convolution interpolation method | Good | Large |
| Spline interpolation method | Best | Largest |

As described above, according to the present embodiment, a settable range of a process parameter for the process B (a spline interpolation coefficient for a spline interpolation process) can be changed depending on the presence or absence of an optical low-pass filter and a color filter array pattern, and thus the user can select any process which is the optimum for generation of the enlarged image data 38 based on the imaging data 32.

<Fourth Embodiment>

Figure 12:
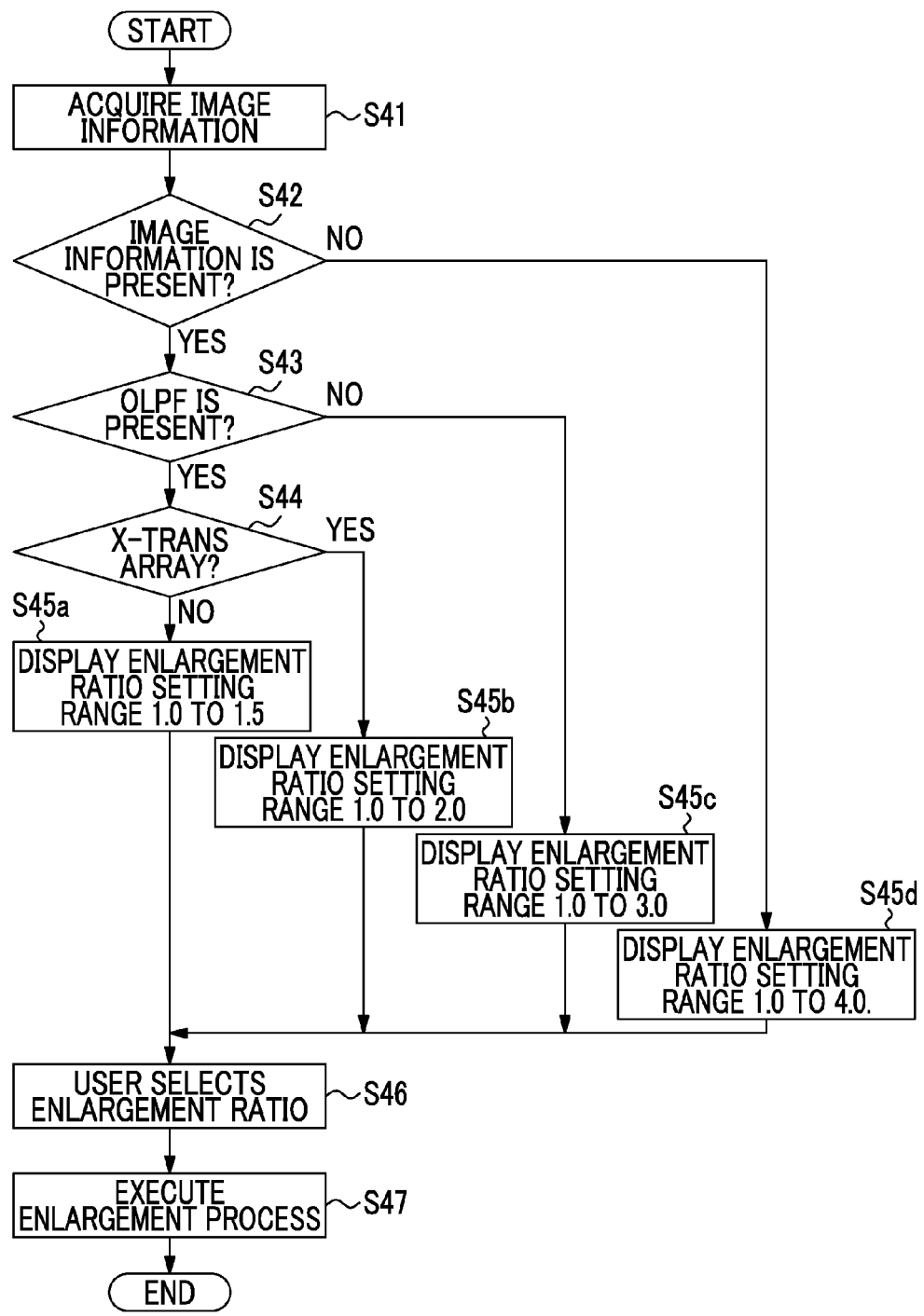
FIG. 12 is a flowchart illustrating a flow of an enlargement process of a fourth embodiment.

With reference to FIGS. 6 and 12, a description will be made of an image enlargement process example according to a fourth embodiment. FIG. 12 is a flowchart illustrating a flow of an enlargement process of the fourth embodiment.

In the present embodiment, detailed description of processes which are the same as or similar to those of the above-described third embodiment will be omitted.

In the present embodiment, a parameter settable range of a magnification in an enlargement process is controlled depending on the presence or absence of photographing condition data, the presence or absence of an optical low-pass filter, and a color filter array.

Also in the present embodiment, in the same manner as in the third embodiment, if the image photographing data (not including enlarged image data) 30 is input to the image enlargement processing portion 16, the data acquisition section 70 acquires the photographing condition data 34 (step S41 of FIG. 12). In addition, the enlargement process determination section 72 judges whether or not photographing condition data is included in the image photographing data 30 (step S42), judges whether or not the optical low-pass filter (OLPF) 64 is present (step S43), and judges whether a color filter (CF) which is used has the color filters (X-Trans array) of FIGS. 4B and 5 (step S44).

In the present embodiment, a parameter selectable range (a range including a plurality of selection candidates) of a magnification in an enlargement process may be determined on the basis of the presence or absence of the photographing condition data 34, the presence or absence of the optical low-pass filter 64, and whether use color filters have the X-Trans array.

For example, in a case where it is judged that photographing condition data is not included in the image photographing data 30 (No in step S42), the enlargement process determination section 72 displays "1.0 to 4.0" which is a relatively wide magnification on the display portion 22 as a selectable range of a magnification (step S45d). In addition, in a case where it is judged that the photographing condition data is included in the image photographing data 30 (Yes in step S42), and the optical low-pass filter 64 is not used (No in step S43), the enlargement process determination section 72 displays a "range of 1.0 to 3.0" on the display portion 22 as a selectable range of a magnification since there is a low possibility that a reduction in resolution may occur even if enlargement is performed in that state (step S45c). Further, in a case where photographing is performed by an imaging element provided with color filters having the array pattern (X-Trans array) as illustrated in FIGS. 4B and 5, image data containing a high frequency component can be acquired and there is a low possibility that a reduction in resolution may occur even if an enlargement process is performed in that state, when compared with a case of the Bayer array. Therefore, in a case where the optical low-pass filter 64 is used (Yes in step S43), and the X-Trans array color filters illustrated in FIGS. 4B and 5 are used (Yes in step S44), the enlargement process determination section 72 displays a "range of 1.0 to 2.0" on the display portion 22 as a selectable range of a magnification (step S45b). On the other hand, in a case where color filters having an array such as the Bayer array other than the X-Trans array illustrated in FIGS. 4B and 5 are used (No in step S44), the enlargement process determination section 72 displays a "range of 1.0 to 1.5" which is a relatively narrow range on the display portion 22 as a selectable range of a magnification (step S45a).

The user may select any magnification from among selection candidates included in the selectable ranges determined in the above-described manner, via the selection indicating portion 78. If selection of a magnification is input via the selection indicating portion 78 (step S46), the enlargement processing section 76 performs an enlargement process on the basis of the magnification which is selected and input by the user (step S47).

Next, a description will be made of a modification example of the above-described fourth embodiment with reference to a flowchart illustrated in FIG. 13.

In the present modification example, in a case where it is obvious that imaging data is acquired under a condition in which resolution of image data is not reduced even if an image enlargement process is performed, a magnification settable range is made to be flexible, and a range of 1.0 to 5.0 is set as the magnification settable range (step S245d), in the same manner as in a case where "an optical low-pass filter is not used (No in step S243a of FIG. 13)" and "the color filters (X-Trans array) of FIGS. 4B and 5 which allow high resolution imaging data 32 to be acquired are used (Yes in step S243b)". On the other hand, in a case where "an optical low-pass filter is not used (No in step S243a)" and "not the color filters (X-Trans array) of FIGS. 4B and 5 but other color filters having the Bayer array illustrated in FIG. 4A are used (No in step S243b)", there is a high possibility that a reduction in resolution of imaging data may not be visible, but there is a possibility that image deterioration may be visible. Therefore, a magnification settable range is set to 1.0 to 3.0 which is an intermediate range (step S245c).

In addition, in a case where the optical low-pass filter is used (Yes in step S243a), and the color filters (X-Trans array) of FIGS. 4B and 5 are used (Yes in step S244), a range of 1.0 to 2.0 is set as a magnification settable range (step S235b). On the other hand, in a case where the optical low-pass filter is used (Yes in step S243a), and not the color filters (X-Trans array) of FIGS. 4B and 5 but other color filters having the Bayer array illustrated in FIG. 4A are used (No in step S244), a range of 1.0 to 1.5 is set as a magnification settable range (step S235a). Other process steps are the same as the process steps in FIG. 12 described above.

Figure 13:
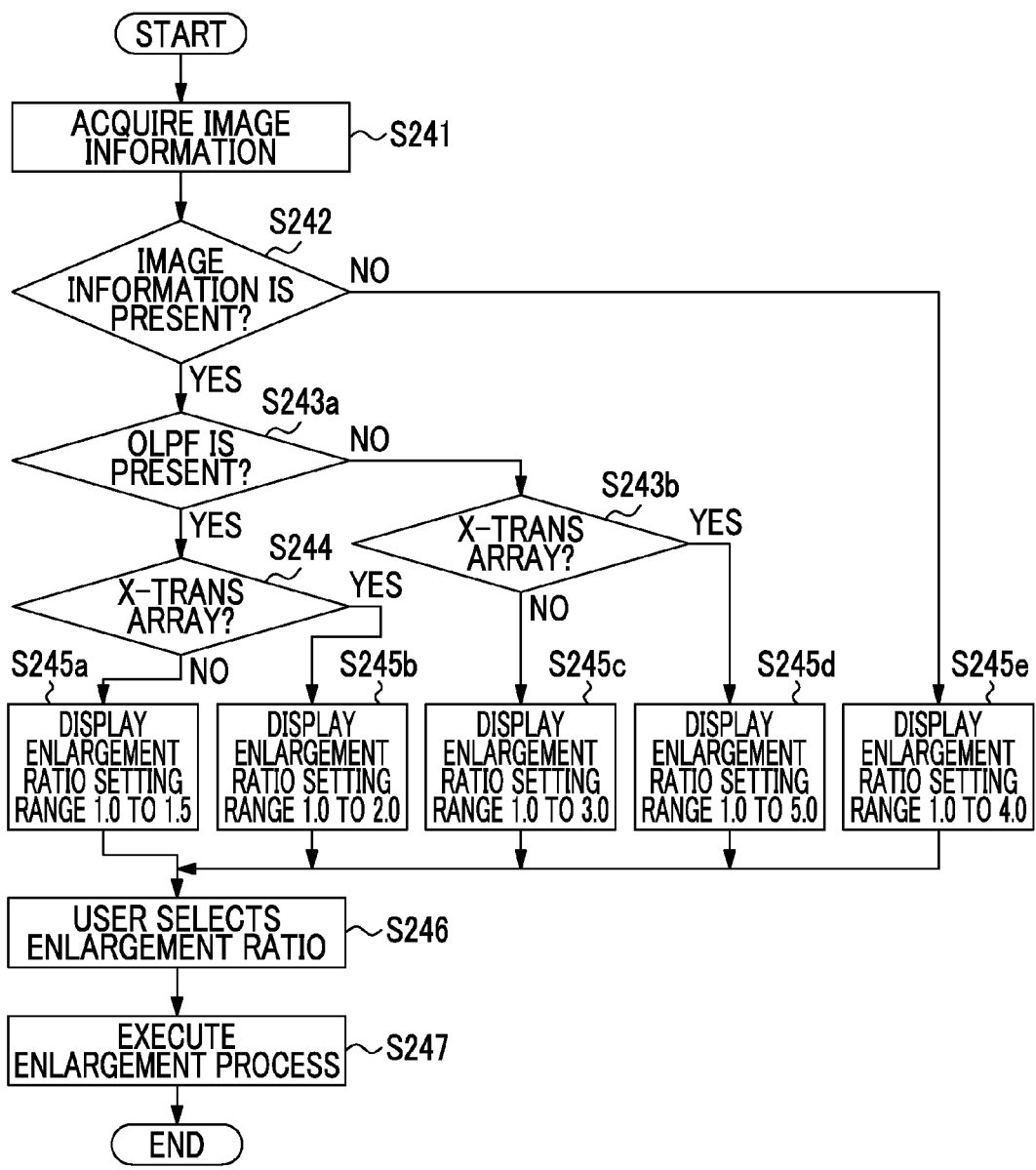
FIG. 13 is a flowchart illustrating a modification example of the fourth embodiment.

According to the modification example illustrated in FIG. 13, in a case where it is obvious that imaging data has high resolution, and a degree of reduction in resolution is low during enlargement of an image, an enlargement process (setting of a spline interpolation coefficient) is performed in consideration of such image characteristics, and thus enlarged image data with a high magnification can be obtained.

In addition, the numerical values of a magnification settable range as illustrated in FIGS. 12 and 13 are only an example, and the magnification settable range may be set to other numerical values. For example, a magnification settable range in each case may be determined by using other values which do not cause a magnitude relationship between numerical values to vary.

As described above, according to the present embodiment, a magnification settable range in the enlargement process can be changed depending on the presence or absence of an optical low-pass filter and a color filter array pattern, and thus the user can select any process which is the optimum for generation of the enlarged image data 38 based on the imaging data 32.

<Fifth Embodiment>

Figure 14:
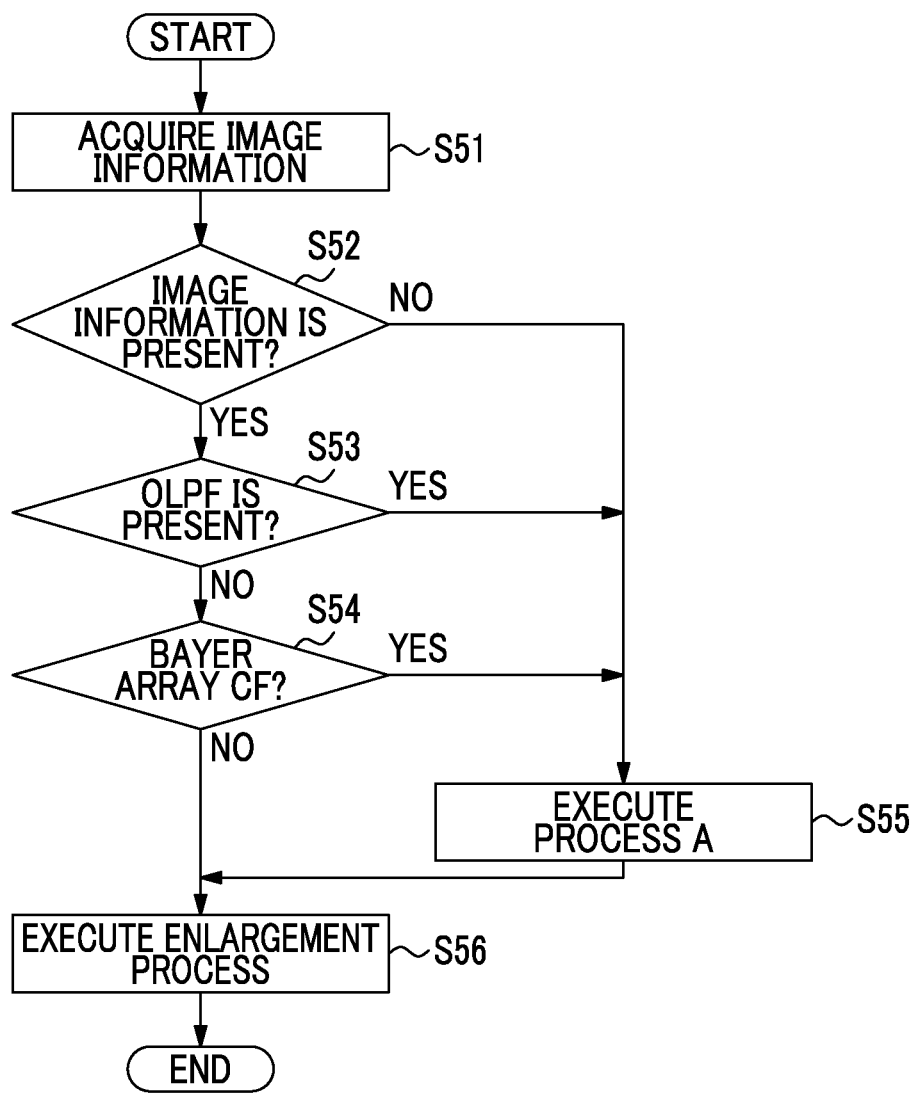
FIG. 14 is a flowchart illustrating a flow of an enlargement process of a fifth embodiment.

With reference to FIGS. 6 and 14, a description will be made of an image enlargement process example according to a fifth embodiment. FIG. 14 is a flowchart illustrating a flow of an enlargement process of the fifth embodiment.

In the present embodiment, detailed description of processes which are the same as or similar to those of the above-described second embodiment will be omitted.

The present embodiment is applicable to, for example, a case where an image enlargement process is performed in a sensor interchangeable camera. For example, an imaging unit or the like is assumed in which a lens unit (imaging portion)

including the lens portion 48 to the imaging element 52 in FIG. 3 can be selectively interchanged with at least a first lens unit (first imaging portion) and a second lens unit (second imaging portion).

In the above-described second embodiment (refer to FIG. 9A), whether or not an enlargement associated process (the process A or the contour emphasis process) is to be executed is temporarily displayed on the display portion 22, and then whether or not the process A is to be executed is determined on the basis of selection and settlement (step S27 of FIG. 9A) performed by the user. In contrast, in the present embodiment, whether or not an enlargement associated process (the process A or the contour emphasis process) is to be executed is not displayed on the display portion 22, and the enlargement associated process (the process A or the contour emphasis process) is forced to be executed regardless of selection and settlement performed by the user.

In other words, if the image photographing data (not including enlarged image data) 30 is input to the image enlargement processing portion 16, the data acquisition section 70 acquires the photographing condition data 34 (step S51 of FIG. 14). In addition, the enlargement process determination section 72 judges that photographing condition data is included in the image photographing data 30 (Yes in step S52), the optical low-pass filter 64 is not used (No in step S53), and a color filter (CF) which is used does not have the Bayer array (No in step S54), an image enlargement process is performed in the enlargement processing section 76 in a state in which the process A is not performed (step S56).

On the other hand, it is judged that photographing condition data is not included in the image photographing data 30 (No in step S52), the optical low-pass filter 64 is used (Yes in step S53), or a color filter which is used has the Bayer array (Yes in step S54), the process A (the contour emphasis process or the like) is forced to be executed in the enlargement associated processing section 74 (step S55), and an enlargement process is executed in the enlargement processing section 76 (step S56).

<Sixth Embodiment>

Figure 15:
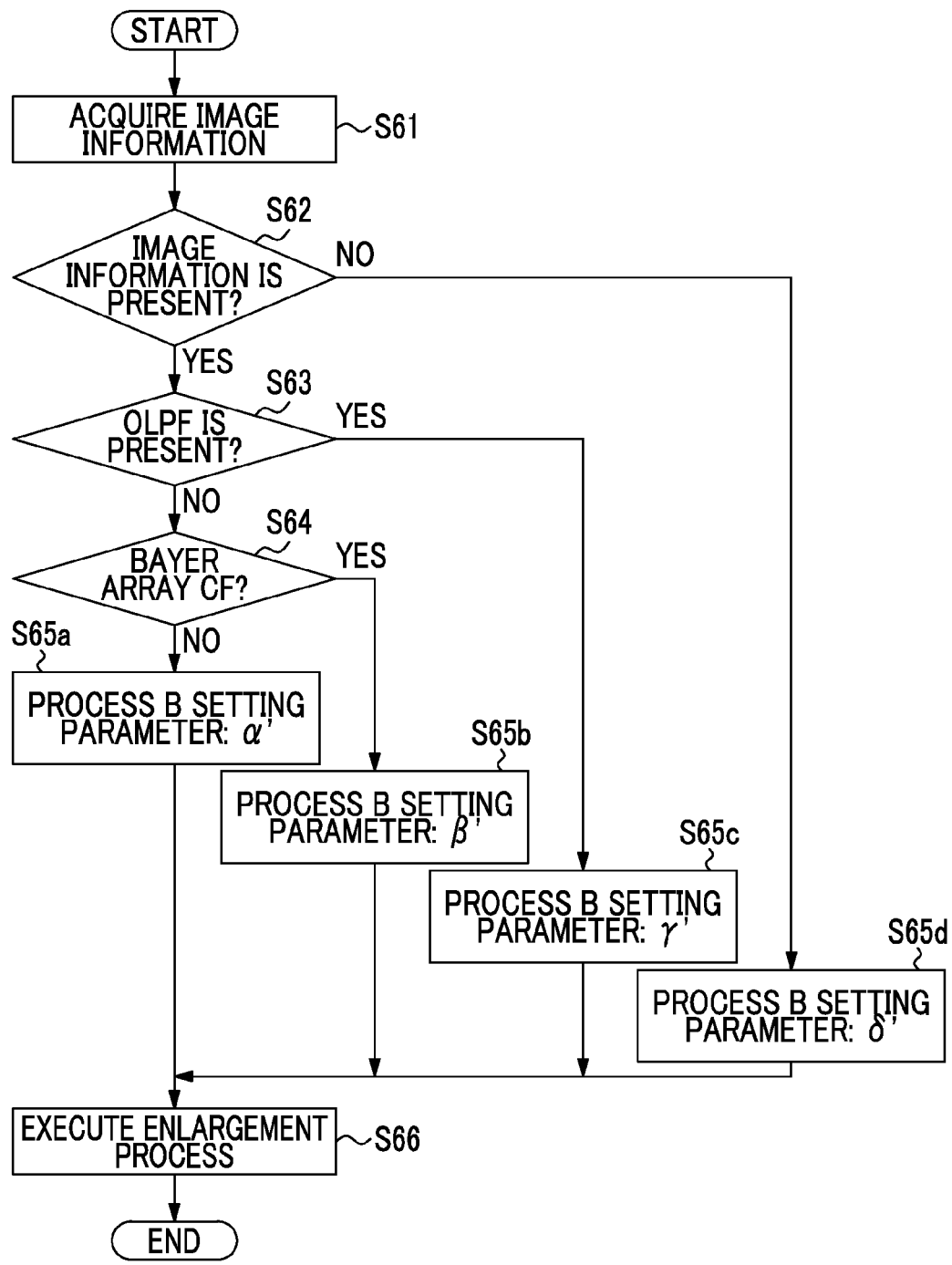
FIG. 15 is a flowchart illustrating a flow of an enlargement process of a sixth embodiment.

With reference to FIGS. 6 and 15, a description will be made of an image enlargement process example according to a sixth embodiment. FIG. 15 is a flowchart illustrating a flow of an enlargement process of the sixth embodiment.

In the present embodiment, detailed description of processes which are the same as or similar to those of the above-described third embodiment will be omitted.

In the above-described third embodiment (refer to FIG. 10A), a parameter range in an enlargement process (the process B or the spline interpolation process) is temporarily displayed on the display portion 22, and then the process B is executed on the basis of selection and settlement (step S36 of FIG. 10A) performed by the user. In contrast, in the present embodiment, a parameter for a process (the process B or the spline interpolation process) in an enlargement process is not displayed on the display portion 22, a parameter for the process (the process B or the spline interpolation process) in the enlargement process is forced to be determined regardless of selection and settlement performed by the user, and the process B (the enlargement process) is executed.

In other words, if the image photographing data (not including enlarged image data) 30 is input to the image enlargement processing portion 16, the data acquisition section 70 acquires the photographing condition data 34 (step S61 of FIG. 15). In addition, in a case where it is judged that photographing condition data is not included in the image photographing data 30 (No in step S62), the enlargement process determination section 72 employs and determines "δ'" as a process parameter (a spline interpolation coefficient or the like) for the process B (step S65*d*). Further, in a case where it is judged that photographing condition data is included in the image photographing data 30 (Yes in step S62), and the optical low-pass filter 64 is used (Yes in step S63), the enlargement process determination section 72 employs and determines "γ'" as a process parameter for the process B (step S65*c*). Furthermore, it is judged that the optical low-pass filter 64 is not used (No in step S63), and an array of color filters is the Bayer array (Yes in step S64), the enlargement process determination section 72 employs and determines "β'" as a process parameter for the photographing condition data (step S65*b*). On the other hand, in a case where it is judged that an array of color filters is not the Bayer array (No in step S64), the enlargement process determination section 72 employs and determines "α'" as a process parameter for the process B (step S65*a*).

The enlargement processing section 76 performs the process B (enlargement process) on the basis of the parameters α', β', γ' and δ' which are employed and determined in the above-described manner (step S66).

<Seventh Embodiment>

Figure 16:
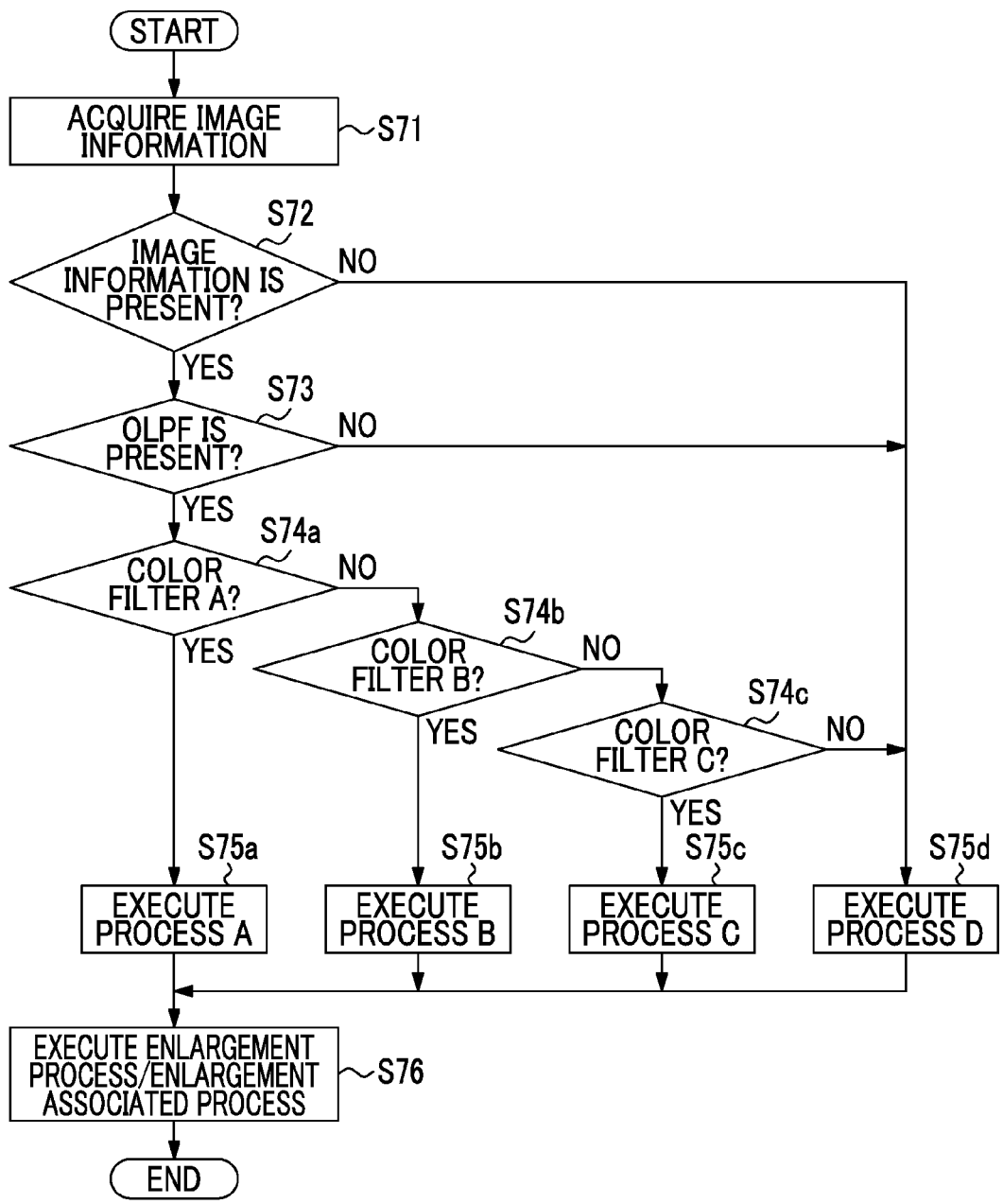
FIG. 16 is a flowchart illustrating a flow of an enlargement process of a seventh embodiment.

With reference to FIGS. 6 and 16, a description will be made of an image enlargement process example according to a seventh embodiment. FIG. 16 is a flowchart illustrating a flow of an enlargement process of the seventh embodiment.

In the present embodiment, detailed description of processes which are the same as or similar to those of the above-described sixth embodiment will be omitted.

The present embodiment relates to an enlargement process in a case where three or more types of array patterns of color filters which are used are assumed.

In other words, if the image photographing data (not including enlarged image data) 30 is input to the image enlargement processing portion 16, the data acquisition section 70 acquires the photographing condition data 34 (step S71 of FIG. 16). In addition, in a case where it is judged that photographing condition data is not included in the image photographing data 30 (No in step S72), the enlargement process determination section 72 determines execution of a process D (step S75*d*). Further, in a case where it is judged that photographing condition data is included in the image photographing data 30 (Yes in step S72), and the optical low-pass filter 64 is not used (No in step S73), the enlargement process determination section 72 determines execution of the process D (step S75*c*).

Furthermore, it is judged that the optical low-pass filter 64 is used (Yes in step S73), and an array pattern of color filters is a pattern A (Yes in step S74*a*), the enlargement process determination section 72 determines execution of a process A (step S75*a*). On the other hand, in a case where it is judged that an array pattern of color filters is not the pattern A (No in step S74*a*) but a pattern B (Yes in step S74*b*), the enlargement process determination section 72 determines execution of a process B (step S75*b*). Moreover, in a case where it is judged that an array pattern of color filters is not the pattern B (No in step S74*b*) but a pattern C (Yes in step S74*c*), the enlargement process determination section 72 determines execution of the process C (step S75*c*). In addition, in a case where it is judged that an array pattern of color filters is not even the pattern C (No in step S74*c*) the enlargement process determination section 72 determines execution of the process D (step S75*d*).

Processes are performed in the enlargement associated processing section 74 and the enlargement processing section 76 on the basis of the process A, the process B, the process C, and the process D which are determined in the above-described manner (step S76). In addition, the process A, the process B, the process C, and the process D may be enlargement associated processes in the enlargement associated processing section 74, and may be enlargement processes in the enlargement processing section 76. In a case where the process A, the process B, the process C, and the process D are enlargement associated processes in the enlargement associated processing section 74, preprocesses of the enlargement process can be appropriately changed. For example, a degree of contour emphasis in the contour emphasis process may be determined for each of the process A, the process B, the process C, and the process D. In addition, the process A, the process B, the process C, and the process D may be respectively processes of determining an interpolation coefficient (a spline interpolation coefficient or the like) or a magnification for an enlargement process in the enlargement processing section 76.

<Eighth Embodiment>

Figure 17:
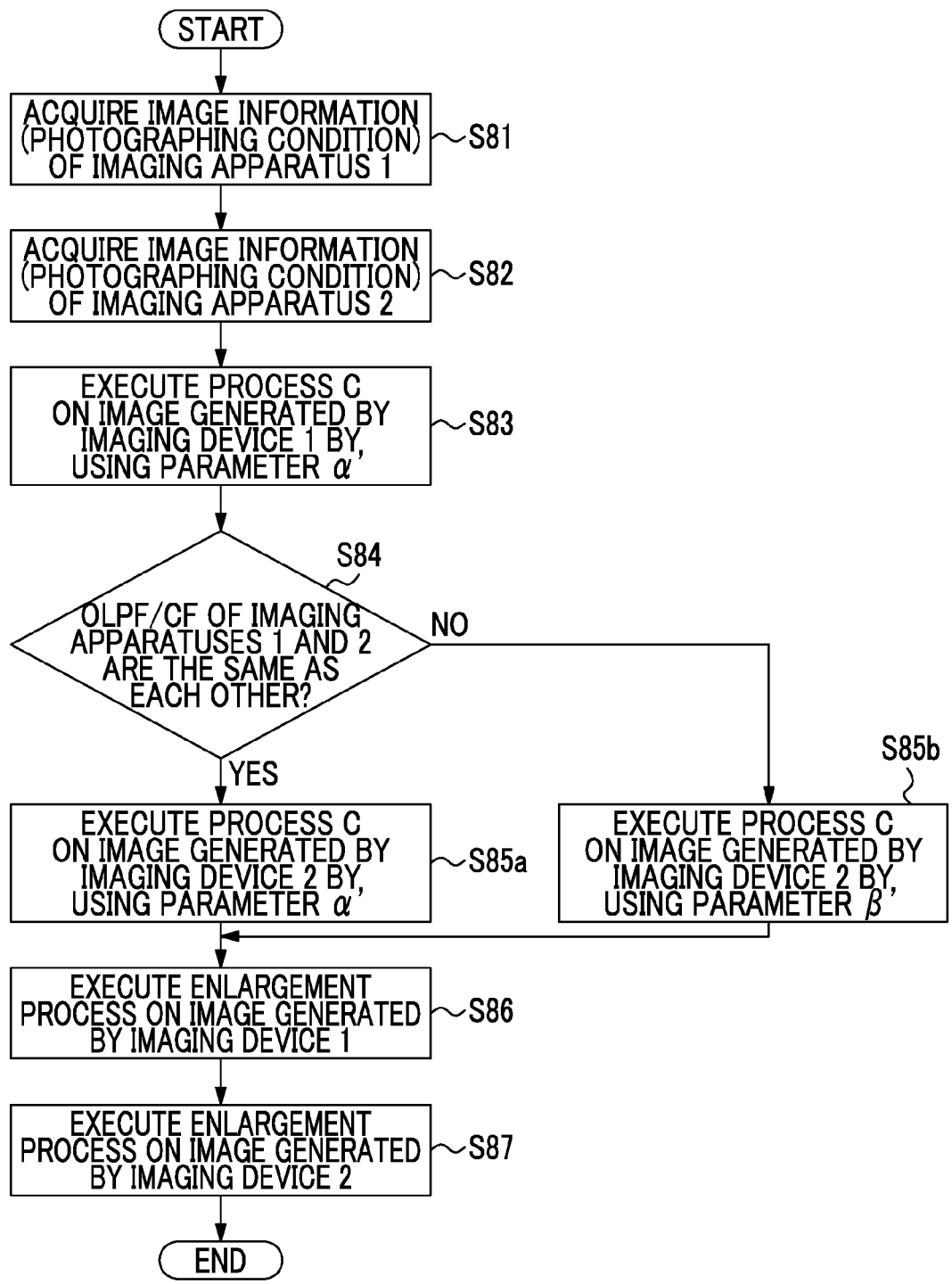
FIG. 17 is a flowchart illustrating a flow of an enlargement process of an eighth embodiment.

With reference to FIGS. 6 and 17, a description will be made of an image enlargement process example according to an eighth embodiment. FIG. 17 is a flowchart illustrating a flow of an enlargement process of the eighth embodiment.

In the present embodiment, detailed description of processes which are the same as or similar to those of the above-described first embodiment will be omitted.

The present embodiment relates to an image enlargement process in a case where image photographing data items 30 generated by a plurality of imaging devices (in this example, an imaging device 1 and an imaging device 2) are input to the image enlargement processing portion 16.

In other words, also in the present embodiment, in the same manner as in the first embodiment, the image photographing data (not including enlarged image data) 30 is input to the image enlargement processing portion 16, but the image photographing data 30 is sent to the image enlargement processing portion 16 from each of the imaging device 1 and the imaging device 2.

The data acquisition section 70 acquires the photographing condition data 34 from the image photographing data 30 of the imaging device 1 (step S81 of FIG. 17), and acquires the photographing condition data 34 from the image photographing data 30 of the imaging device 2 (step S82). The enlargement process determination section 72 performs a judgment of whether or not photographing condition data is included in the image photographing data 30, a judgment of whether or not the optical low-pass filter (OLPF) 64 is present, and a judgment of color filters (CFs) which are used (for example, a judgment of "whether or not the color filters are the color filters A or the color filters B", "the color filters have the Bayer array", or "the color filters have the X-Trans array").

In addition, the enlargement process determination section 72 judges and executes a process C (at least one of whether or not an enlargement associated process is executed, a process parameter for the enlargement associated process, and a process parameter for an enlargement process) so that image quality after the enlargement process is performed between the image photographing data created by the imaging device 1 and the image photographing data created by the imaging device 2 is included in a predetermined allowable range.

The term "quality of an enlarged image after the enlargement process is performed being included in a predetermined allowable range" mentioned here indicates that quality of an image obtained through the enlargement process is included in the predetermined allowable range, and refers to, for example, various parameters which cause a reduction in a resolution or image deterioration (moire or the like) in an enlarged image being included in the predetermined allowable range. A spatial frequency, a saturation level, or the like may be used as a reference of the "quality of an enlarged image". For example, in order to further prevent color moire which is a phenomenon in which a color is attached to an image of a subject which is originally gray, a saturation level is used as a reference of quality of an enlarged image, and the presence or absence of an enlargement associated process, a parameter for the enlargement associated process, and a parameter for an enlargement process may be determined for each imaging portion (imaging device) so that the saturation level is included in a predetermined allowable range. Specifically, a resolution chart may be acquired for each of a plurality of imaging portions through photographing in advance; quality of an enlarged image may be evaluated; and a magnification, a process parameter, and the like may be determined for each imaging portion in advance so that the evaluation result is included in a predetermined allowable range. In addition, the "predetermined allowable range" mentioned here is not particularly limited. An appropriate range corresponding to various requests may be employed as the "predetermined allowable range", and the "predetermined allowable range" may be determined on the basis of, for example, characteristics of an imaging element or a lens or image processing characteristics.

The enlargement process determination section 72 of the present embodiment judges and sets (determines) a process parameter α' of the process C for an image (the imaging data 32) generated by the imaging device 1 on the basis of the acquisition result of the photographing condition data by the data acquisition section 70, and the enlargement associated processing section 74 executes the process C on the image generated by the imaging device 1 by using the process parameter α' (step S83).

In addition, the enlargement process determination section 72 judges whether or not the photographing condition data 34 of an image (the imaging data 32) generated by the imaging device 1 is the same as the photographing condition data 34 of the image (the imaging data 32) generated by the imaging device 2 on the basis of the acquisition result from the data acquisition section 70 (step S84). More specifically, the enlargement process determination section 72 judges whether or not the image generated by the imaging device 1 is the same as the image generated by the imaging device 2 in relation to whether or not the presence or absence of the optical low-pass filter and a color filter array employed as the photographing condition data 34 are in the same state.

It is judged that the photographing condition data items of the image generated by the imaging device 1 and the image generated by the imaging device 2 are the same as each other (Yes in step S84), the enlargement process determination section 72 sets a process parameter of the process C for the image generated by the imaging device 2 to "α'" which is the same as that of the image generated by the imaging device 1. The enlargement associated processing section 74 executes the process C on the image generated by the imaging device 2 by using the process parameter α' (step S85a).

On the other hand, it is judged that the photographing condition data items of the image generated by the imaging device 1 and the image generated by the imaging device 2 are not the same as each other (No in step S84), the enlargement process determination section 72 judges and sets a process parameter of the process C for the image generated by the imaging device 2 to "β'" which is different from that of the image generated by the imaging device 1. The enlargement associated processing section 74 executes the process C on the image generated by the imaging device 2 by using the process parameter β' (step S85b). In addition, the setting of the process parameter β' is performed according to the same reference and order as those of the above-described process parameter α'.

Each of the image generated by the imaging device 1 and the image generated by the imaging device 2 having undergone the process C as mentioned above is then subject to an image enlargement process in the enlargement processing section 76 (steps S86 and S87).

Further, the process C mentioned here may be an enlargement associated process (a contour emphasis process or the like), and may be a simple setting process of a process parameter (an interpolation coefficient, a magnification, or the like) for performing an enlargement process in the enlargement processing section 76.

As described above, according to the present embodiment, in a case where enlarged image data is generated from the imaging data items 32 which are created through photographing by a plurality of different imaging devices, even if the image photographing data 30 is acquired from any imaging device, qualities of enlarged images are made to be equivalent to each other according to the presence or absence of an optical low-pass filter and an array pattern of color filters.

In addition, a plurality of imaging devices (the imaging device 1 and the imaging device 2) may be incorporated into the same apparatus, and may be incorporated into separate apparatuses.

In a case where the plurality of imaging devices are incorporated into the same apparatus, the imaging devices may have the same configurations as, for example, the first imaging portion 12A and the second imaging portion 12B of FIG. 1B. On the other hand, in a case where the plurality of imaging devices are incorporated into separate apparatuses, there may be a configuration in which there are a plurality of imaging units 10" connected to the computer 11 of FIG. 1C. Even in a case where different imaging units 10" are connected to the computer 11, qualities of enlarged images can be maintained in the same degree, and thus it is possible to alleviate inconvenience such as discomfort of a user.

As mentioned above, although the preferred embodiments of the present invention have been described, the present invention is not limited to the above-described embodiments and is applicable to other forms as appropriate.

For example, in the above-described embodiments, the digital camera has been described (refer to FIG. 3), but a configuration of the photographing apparatus is not limited thereto. Other photographing apparatuses (imaging apparatus) to which the present invention is applicable may include, for example, an internal or external camera for a PC, or a portable terminal apparatus having a photographing function, as described below. In addition, the present invention is applicable to a program which causes a computer to execute the above-described respective process steps.

The portable terminal apparatus which is an embodiment of the photographing apparatus of the present invention may be, for example, a mobile phone, a smart phone, a personal digital assistant (PDA), or a portable game machine. Hereinafter, the smart phone will be described in detail as an example with reference to the drawings.

Figure 18:
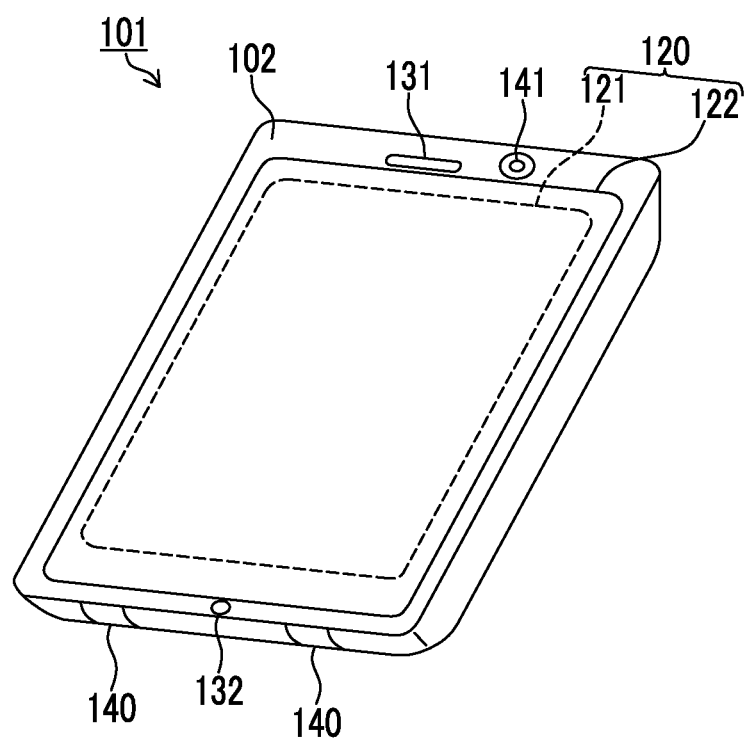
FIG. 18 is an exterior view of a smart phone which is an example of a photographing apparatus of the present invention.

FIG. 18 illustrates an exterior of a smart phone 101 which is an embodiment of the photographing apparatus of the present invention. The smart phone 101 illustrated in FIG. 18 has a plate-shaped casing 102 and is provided with a display input portion 120 in which a display panel 121 as a display section and an operation panel 122 as an input section are integrally formed with each other on one surface of the casing 102. In addition, the related casing 102 includes a speaker 131, a microphone 132, an operation portion 140, and a camera portion 141. Further, a configuration of the casing 102 is not limited thereto. For example, the casing may employ a configuration in which the display section and the input section are provided separately, and may employ a configuration in which a folding structure or a sliding mechanism is provided.

Figure 19:
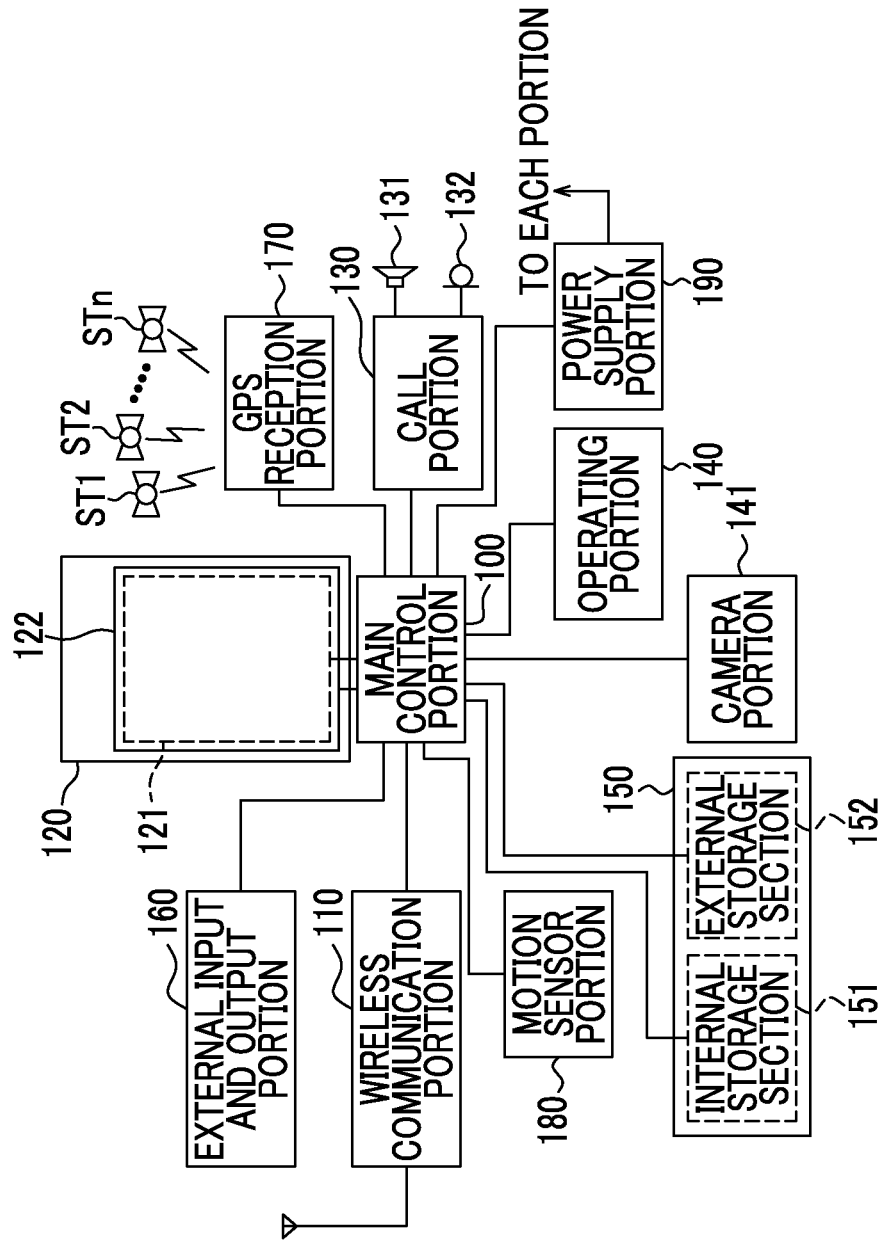
FIG. 19 is a block diagram illustrating a configuration of the smart phone illustrated in FIG. 18.

FIG. 19 is a block diagram illustrating a configuration of the smart phone 101 illustrated in FIG. 18. As illustrated in FIG. 19, the smart phone includes, as main constituent elements, a wireless communication portion 110, the display input portion 120, a call portion 130, the operation portion 140, the camera portion 141, a storage portion 150, an external input and output portion 160, a global positioning system (GPS) reception portion 170, a motion sensor portion 180, a power supply portion 190, and a main control portion 100. In addition, the smart phone 101 has a wireless communication function as a main function and performs mobile wireless communication via a base station apparatus BS and a mobile communication network NW.

The wireless communication portion 110 performs wireless communication with the base station apparatus BS accommodated in the mobile communication network NW in response to an instruction from the main control portion 100. By using related wireless communication, transmission and reception of various file data items such as audio data and image data, electronic mail data, and the like, or reception of web data, streaming data, or the like, is performed.

The display input portion 120 is a so-called touch panel which displays images (still image and moving image) or text information, or the like so as to visually transmit the information to a user and detects a user's operation on the displayed information, and includes the display panel 121 and the operation panel 122.

The display panel 121 uses a liquid crystal display (LCD), an organic electro-luminescence display (OELD), or the like as a display device. The operation panel 122 is a device which is placed so that an image displayed on a display surface of the display panel 121 is can be visually recognized and detects one or a plurality of coordinates which are operated with a user's finger or a stylus. If the related device is operated with a user's finger or a stylus, a detection signal which is generated due to the operation is output to the main control portion 100. Next, the main control portion 100 detects an operation position (coordinates) on the display panel 121 on the basis of the received detection signal.

As illustrated in FIG. 18, the display panel 121 and the operation panel 122 of the smart phone 101 which is exemplified as an embodiment of the photographing apparatus of the present invention are integrally formed with each other so as to constitute the display input portion 120, but the operation panel 122 is disposed to completely cover the display panel 121. In a case where the related arrangement is employed, the operation panel 122 may have a function of detection a user's operation even in a region other than the display panel 121. In other words, the operation panel 122 may have a detection region (hereinafter, referred to as a display region) for a part overlapping the display panel 121 and another detection region (hereinafter, referred to as a non-display region) for an outer edge part which does not overlap the display panel 121.

In addition, a size of the display region and a size of the display panel 121 may be exactly the same as each other but are not necessarily the same as each other. Further, the operation panel 122 may be provided with two sensing regions including the outer edge part and an inner part other than the outer edge part. Furthermore, a width of the outer edge part is appropriately designed according to a size or the like of the casing 102. Moreover, position detection methods used for the operation panel 122 may include a matrix switch method, a resistive film method, a surface acoustic wave method, an infrared method, an electromagnetic induction method, a capacitance method, and the like, and any method may be used.

The call portion 130 includes the speaker 131 and the microphone 132, converts a user's voice which is input via the microphone 132 into audio data which can be processed in the main control portion 100 so as to output the audio data to the main control portion 100, or decodes audio data which is received by the wireless communication portion 110 or the external input and output portion 160 so as to output the decoded audio data from the speaker 131. In addition, as illustrated in FIG. 18, for example, the speaker 131 is mounted on the same surface as the surface on which the display input portion 120 is provided, and the microphone 132 may be mounted on a side surface of the casing 102.

The operation portion 140 is a hardware key using a key switch or the like, and receives an instruction from a user. For example, as illustrated in FIG. 18, the operation portion 140 is a pressing button type switch which is mounted on the side surface of the casing 102 of the smart phone 101 and is turned on when pressed with a finger and is turned off by a restoring force of a spring or the like when separated from the finger.

The storage portion 150 stores a control program or control data of the main control portion 100, application software, address data correlated with the name, a phone number, or the like of a communication party, transmitted and received electronic mail data, web data which is downloaded through web browsing, and downloaded content data, and temporarily stores streaming data or the like. In addition, the storage portion 150 is constituted by an internal storage section 151 built into the smart phone and an external storage section 152 having an external memory slot which is attachable and detachable. Further, each of the internal storage section 151 and the external storage section 152 constituting the storage portion 150 is implemented by using a storage medium such as a flash memory type, hard disk type, multimedia card micro type, or card type memory (for example, a Micro SD (registered trademark) memory), a random access memory (RAM), or a read only memory (ROM).

The external input and output portion 160 functions as an interface with all external apparatuses connected to the smart phone 101, and is used to be directly or indirectly connected to other external apparatuses through communication (for example, a universal serial bus (USB), IEEE1394, or the like) or via a network (for example, the Internet, a wireless LAN, Bluetooth (registered trademark), Radio Frequency Identification (RFID), Infrared Data Association (IrDA) (registered trademark), Ultra Wide Band (UWB) (registered trademark), or Zig Bee (registered trademark)).

The external apparatuses connected to the smart phone 101 may be, for example, a wired or wireless headset, a wired or wireless external charger, a wired or wireless data port, a memory card, a subscriber identity module (SIM) card, or a user identity module (UIM) card which is connected via a card socket, an external audio or video apparatus connected via an audio or video input/output (I/O) terminal, an external audio or video apparatus connected in a wireless manner, a smart phone connected in a wired or wireless manner, a personal computer connected in a wired or wireless manner, a PDA connected in a wired or wireless manner, a personal computer connected in a wired or wireless manner, and an earphone. The external input and output portion can transmit data which is transmitted from such external apparatuses to each constituent element of the smart phone 101, or transmits data from each constituent element of the smart phone 101 to the external apparatuses.

The GPS reception portion 170 receives GPS signals transmitted from GPS satellites ST1 to STn in response to an instruction from the main control portion 100, and executes a positioning operational process based on the plurality of received GPS signals so as to detect a position formed by latitude, longitude, and altitude of the smart phone 101. When position information can be obtained from the wireless communication portion 110 or the external input and output portion 160 (for example, a wireless LAN), the GPS reception portion 170 may detect a position by using the position information.

The motion sensor portion 180 includes, for example, a three-axis acceleration sensor, and detects a physical motion of the smart phone 101 in response to an instruction from the main control portion 100. The physical motion of the smart phone 101 is detected, and thus a direction in which the smart phone 101 moves or acceleration thereof is detected. The related detection result is output to the main control portion 100.

The power supply portion 190 supplies power which is accumulated in a battery (not illustrated), to each portion of the smart phone 101 in response to an instruction from the main control portion 100.

The main control portion 100 includes a microprocessor, and operates according to the control program or control data stored in the storage portion 150 so as to collectively control the respective portions of the smart phone 101. In addition, the main control portion 100 has a mobile communication control function of controlling each portion of a communication system and application processing functions, in order to perform audio communication or data communication via the wireless communication portion 110.

The application processing functions are realized by the main control portion 100 which operates according to the application software stored in the storage portion 150. The application processing functions include, for example, an infrared communication function of performing data communication with a counter apparatus by controlling the external input and output portion 160, an electronic mail function of transmitting and receiving an electronic mail, and a web browsing function of viewing a web page.

In addition, the main control portion 100 has an image processing function of displaying images on the display input portion 120 on the basis of image data (data on a still image or a moving image) such as received data or downloaded streaming data. The image processing function indicates a function in which the main control portion 100 decodes the image data, performs an image process on the related decoded result, and displays an image on the display input portion 120.

In addition, the main control portion 100 performs display control on the display panel 121 and operation detection control for detecting a user's operation via the operation portion 140 and the operation panel 122.

As a result of performing the display control, the main control portion 100 displays an icon for starting the application software or a software key such as a scroll bar, or displays a window for creating an electronic mail. In addition, the scroll bar indicates a software key for receiving an instruction for moving a display part of an image in relation to a large image or the like which cannot be completely fit into the display region of the display panel 121.

In addition, as a result of performing the operation detection control, the main control portion 100 detects a user's operation via the operation portion 140, receives an operation on the icon or an input of a text string for an input column of the window via the operation panel 122, or receives a scroll request of a displayed image using the scroll bar.

Further, as a result of performing the operation detection control, the main control portion 100 has a touch panel control function of judging whether an operation position for the operation panel 122 is the overlapping part (display region) with the display panel 121 or the outer edge part (non-display region) which does not overlap the remaining display panel 121, and controlling a sensing region of the operation panel 122 or a display position of a software key.

Furthermore, the main control portion 100 may detect a gesture operation for the operation panel 122 and may perform a preset function according to the detected gesture operation. The gesture operation is not a simple touch operation of the related art but indicates an operation of drawing a trajectory for at least one of a plurality of positions by drawing a trajectory with a finger, by simultaneously designating a plurality of positions, or through a combination thereof.

The camera portion 141 is a digital camera which performs electronic photographing by using an imaging element such as a complementary metal oxide semiconductor (CMOS) or a charge-coupled device (CCD). In addition, under the control of the main control portion 100, the camera portion 141 converts image data obtained through imaging into compressed image data of, for example, Joint Photographic coding Experts Group (JPEG) format, so as to record the compressed image data in the storage portion 150 or to output the image data via the input and output portion 160 or the wireless communication portion 110. In the smart phone 101 illustrated in FIG. 18, the camera portion 141 is mounted on the same surface as the display input portion 120, but a mounted position of the camera portion 141 is not limited thereto. The camera portion may be mounted on a rear surface of the display input portion 120, or a plurality of camera portions 141 may be mounted. Further, in a case where a plurality of camera portions 141 are mounted, photographing may be performed singly through changing of the camera portion 141 used for the photographing, or photographing may be performed by using the plurality of camera portions 141 together.

Furthermore, the camera portion 141 may be used for various functions of the smart phone 101. For example, an image which is acquired by the camera portion 141 may be displayed on the display panel 121, or an image of the camera portion 141 may be used as one of operation inputs for the operation panel 122. In addition, when the GPS reception portion 170 detects a position, a position can be detected by referring to an image from the camera portion 141. Further, an optical axis direction of the camera portion 141 of the smart phone 101 may be judged or the present use circumstances may be judged by referring to an image from the camera portion 141 without using the three-axis acceleration sensor or along with the three-axis acceleration sensor. Of course, an image from the camera portion 141 may be used in the application software.

Furthermore, position information acquired by the GPS reception portion 170, audio information (which may be text information obtained by the main control portion or the like performing audio/text conversion) acquired by the microphone 132, attitude information acquired by the motion sensor portion 180, and the like may be added to imaging data of a still image or a moving image which is then recorded in the storage portion 150 or is output via the input and output portion 160 or the wireless communication portion 110.

In addition, in the above-described smart phone 101, the camera portion 141 functions as the imaging portion (12, 12A, or 12B) of FIG. 1; the main control portion 100 functions as the digital image processing portion (14, 14A or 14B) and the image enlargement processing portion 16 of FIG. 1; the operation portion 140 and the operation panel 122 function as the user I/F 17; the main control portion 100 and the external input and output portion 160 function as the input and output control portion 18 of FIG. 1; the storage portion 150 functions as the storage portion 20 of FIG. 1; and the display panel 121 functions as the display portion 22 of FIG. 1.

What is claimed is:

1. An image processing device to which image photographing data including imaging data is input, comprising:
    a data acquisition unit that judges whether or not photographing condition data is included in the input image photographing data, and that acquires content of the photographing condition data when it is judged that the photographing condition data is included in the input image photographing data; and
    an enlargement process determination unit that determines a process parameter for an enlargement process for generating enlarged image data from the image data, on the basis of the acquisition result of the photographing condition data by the data acquisition unit,
    an enlargement processing unit that performs an interpolation process in the enlargement process using the process parameter which is decided by the enlargement process determination unit,
    wherein the photographing condition data includes information regarding an array of color filters of an imaging portion used to create the imaging data and information regarding presence or absence of an optical low-pass filter during creation of the imaging data, wherein the enlargement process determination unit sets a lower limit of a range for the process parameter of the interpolation process for the imaging data when the imaging data is photographed by a bayer array imaging element having the optical low-pass filter, as higher than a lower limit of a range for the process parameter of the interpolation process for the imaging data when the imaging data is photographed by an imaging element having a non-bayer array of color filters by which moiré is suppressed without the optical low pass filter.

2. The image processing device according to claim 1,
    wherein the enlargement process determination unit sets the lower limit of the range for the process parameter of the interpolation process for the imaging data when the imaging data is photographed by a bayer array imaging element, as higher than the lower limit of the range for the process parameter of the interpolation process for the imaging data when the imaging data is photographed by the non-bayer array imaging element.

3. The image processing device according to claim 1,
    wherein the enlargement process determination unit sets the lower limit of the range for the process parameter of the interpolation process for the imaging data when the imaging data is photographed by the bayer array imaging element having the optical low-pass filter, as higher than the lower limit of a range for the process parameter of the interpolation process for the imaging data when the imaging data is photographed by a non-bayer array imaging element having the optical low-pass filter, and sets the lower limit of a range for the process parameter of the interpolation process for the imaging data when the imaging data is photographed by the imaging element without the optical low-pass filter, as lower than the lower limit of a range for the process parameter of the interpolation process for the imaging data when the imaging data is photographed by the non-bayer imaging element without the optical low-pass filter.

4. An image processing device to which image photographing data including imaging data is input, comprising:
- a data acquisition unit that judges whether or not photographing condition data is included in the input image photographing data, and that acquires content of the photographing condition data when it is judged that the photographing condition data is included in the input image photographing data; and
- an enlargement process determination unit that determines, a process parameter for an enlargement process for generating enlarged image data from the image data, on the basis of the acquisition result of the photographing condition data by the data acquisition unit,
- an enlargement processing unit that performs an enlargement process in the using an enlargement ratio which is decided by the enlargement process determination unit,
- wherein the photographing condition data includes information regarding an array of color filters of an imaging portion used to create the imaging data and information regarding presence or absence of an optical low-pass filter during creation of the imaging data,
- wherein the enlargement process determination unit sets an upper limit of a range for the process parameter of the enlargement process for the imaging data when the imaging data is photographed by a bayer array imaging element having the optical low-pass filter, as lower than an upper limit of a range for the process parameter of the enlargement process for the imaging data when the imaging data is photographed by an imaging element having a non-bayer array of color filters by which moiré is suppressed without the optical low pass filter.

5. The image processing device according to claim 4,
- wherein the enlargement process determination unit sets the upper limit of the range for the process parameter of the enlargement process for the imaging data when the imaging data is photographed by the bayer array imaging element, as lower than the upper limit of the range for the process parameter of the enlargement process for the imaging data when the imaging data is photographed by the imaging element having the non-bayer array of color filters by which moiré is suppressed without the optical low pass filter.

6. The image processing device according to claim 4,
- wherein the enlargement process determination unit sets the upper limit of the range for the process parameter of the enlargement process for the imaging data when the imaging data is photographed by the bayer array imaging element having the optical low-pass filter, as lower than the upper limit of the range for the process parameter of the enlargement process for the imaging data when the imaging data is photographed by a non-bayer array imaging element having the optical low-pass filter, and sets the upper limit of the range for the process parameter of the enlargement process for the imaging data when the imaging data is photographed by the imaging element without the optical low-pass filter, as higher than the upper limit of the range for the process parameter of the enlargement process for the imaging data when the imaging data is photographed by the non-bayer imaging element having the optical low-pass filter.

7. The image processing device according to claim 1, wherein the image photographing data, including the imaging data items which are created by a plurality of imaging portions including at least a first imaging portion and a second imaging portion, is input to the image processing device, and
- wherein the enlargement process determination unit determines at least one of the execution or non-execution of an enlargement associated process which associated with the enlargement process, the process parameter for the enlargement associated process, and the process parameter for the enlargement process so that image quality by the enlarged image data after the enlargement process is performed between the image photographing data created by the first imaging portion and the image photographing data created by the second imaging portion is included in a predetermined allowable range.

8. The image processing device according to claim 1, further comprising:
- wherein the enlargement process determination unit determines at least one of the execution or non-execution of an enlargement associated process which is associated with the enlargement process, the process parameter for the enlargement associated process, and the process parameter for the enlargement process,
- and an enlargement associated processing unit that performs the enlargement associated process according to a determination result from the enlargement process determination unit.

9. The image processing device according to claim 1, further comprising:
- wherein the enlargement process determination unit determines at least one of the execution or non-execution of an enlargement associated process which is associated with the enlargement process, the process parameter for the enlargement associated process, and the process parameter for the enlargement process,
- a display unit that displays and a determination result by the enlargement process determination unit.

10. The image processing device according to claim 9, wherein the display unit displays a settlement of the determination result by the enlargement process determination unit related to the execution or non-execution of the enlargement associated process in a selectable manner,
- wherein the image processing device further comprises selection unit that receives user's selection regarding the settlement of the determination result by the enlargement process determination unit, and
- wherein the enlargement process determination unit settles execution or non-execution of the enlargement associated process according to a selection result which is received via the selection unit.

11. The image processing device according to claim 9, wherein the process parameter for the enlargement associated process and the process parameter for the enlargement process determined by the enlargement process determination unit include a plurality of selection candidates,
- wherein the display unit performs display so that the process parameter for the enlargement associated process and the process parameter for the enlargement process can be selected from among the plurality of selection candidates,
- wherein the image processing device further comprises a selection unit that receives a user's selection from among the plurality of selection candidates, and
- wherein the enlargement process determination unit settles the process parameter for the enlargement associated process and the process parameter for the enlargement process according to a selection result which is received via the selection unit.

12. The image processing device according to claim 9, further comprising:

an enlargement associated processing unit that performs the enlargement associated process according to the settled execution or non-execution of the enlargement associated process and the settled process parameter for the enlargement associated process.

13. The image processing device according to claim 9, further comprising:

wherein the enlargement processing unit performs the enlargement process according to the settled process parameter for the enlargement process.

14. An imaging apparatus comprising:

an imaging unit that includes an imaging portion which creates image photographing data including imaging data; and the image processing device according to claim 1.

15. An imaging apparatus comprising:

an imaging unit that includes a plurality of imaging portions which include at least a first imaging portion and a second imaging portion; and the image processing device according to claim 7.

16. An imaging apparatus comprising:

an imaging unit that includes an imaging portion which creates image photographing data including imaging data, in which the imaging portion is interchangeable with one of a plurality of imaging portions including a first imaging portion and a second imaging portion; and the image processing device according to claim 7.

17. A computer comprising the image processing device according to claim 1.

18. An image processing method for an image processing device comprising:

a data acquisition step of judging whether or not photographing condition data is included in image photographing data including imaging data, and for acquiring content of the photographing condition data when it is judged that the photographing condition data is included in the input image photographing data; and an enlargement process determination step of determining a process parameter for an enlargement process for generating enlarged image data from the image data, on the basis of the acquisition result of the photographing condition data, an enlargement processing step of performing an interpolation process in the enlargement process using the process parameter which is decided by the enlargement process determination step, wherein the photographing condition data includes information regarding an array of color filters of an imaging portion used to create the imaging data and information regarding presence or absence of an optical low-pass filter during creation of the imaging data, wherein the enlargement process determination step sets a lower limit of a range for the process parameter of the interpolation process for the imaging data when the imaging data is photographed by a bayer array imaging element having the optical low-pass filter, as higher than a lower limit of a range for the process parameter of the interpolation process for the imaging data when the imaging data is photographed by an imaging element having a non-bayer array of color filters by which moiré is suppressed without the optical low pass filter.

19. An image processing method for an image processing device comprising:

a data acquisition step of judging whether or not photographing condition data is included in image photographing data including imaging data, and for acquiring content of the photographing condition data when it is judged that the photographing condition data is included in the input image photographing data; and an enlargement process determination step of determining, a process parameter for an enlargement process for generating enlarged image data from the image data, on the basis of the acquisition result of the photographing condition data by the data acquisition step, an enlargement processing step of performing an enlargement process in the using an enlargement ratio which is decided by the enlargement process determination step, wherein the photographing condition data includes information regarding an array of color filters of an imaging portion used to create the imaging data and information regarding presence or absence of an optical low-pass filter during creation of the imaging data, wherein the enlargement process determination step sets an upper limit of a range for the process parameter of the enlargement process for the imaging data when the imaging data is photographed by a bayer array imaging element having the optical low-pass filter, as lower than a upper limit of a range for the process parameter of the enlargement process for the imaging data when the imaging data is photographed by an imaging element having a non-bayer array of color filters by which moiré is suppressed without the optical low pass filter.

20. A non-transitory computer readable recording medium storing a program causing a computer to execute the image processing method, comprising:

a procedure of judging whether or not photographing condition data is included in image photographing data including imaging data, and for acquiring content of the photographing condition data when it is judged that the photographing condition data is included in the input image photographing data; and a procedure of determining a process parameter for an enlargement process for generating enlarged image data from the image data, on the basis of the acquisition result of the photographing condition data, a procedure of an enlargement processing that performs an interpolation process in the enlargement process using the process parameter which is decided by the procedure of determining the process parameter, wherein the photographing condition data includes information regarding an array of color filters of an imaging portion used to create the imaging data and information regarding presence or absence of an optical low-pass filter during creation of the imaging data, wherein the enlargement process determination procedure sets a lower limit of a range for the process parameter of the interpolation process for the imaging data when the imaging data is photographed by a bayer array imaging element having the optical low-pass filter, as higher than a lower limit of a range for the process parameter of the interpolation process for the imaging data when the imaging data is photographed by an imaging element having a non-bayer array of color filters by which moiré is suppressed without the optical low pass filter.

21. A non-transitory computer readable recording medium storing a program causing a computer to execute the image processing method, comprising:

a procedure of judging whether or not photographing condition data is included in image photographing data including imaging data, and for acquiring content of the photographing condition data when it is judged that the photographing condition data is included in the input image photographing data; and a procedure of determining a process parameter for an enlargement process for generating enlarged image data from the image data, on the basis of the acquisition result of the photographing condition data, a procedure of an enlargement processing that performs an interpolation process in the enlargement process using the process parameter which is decided by the procedure of determining the process parameter, wherein the photographing condition data includes information regarding an array of color filters of an imaging portion used to create the imaging data and information regarding presence or absence of an optical low-pass filter during creation of the imaging data, wherein the enlargement process determination procedure sets an upper limit of a range for the process parameter of the enlargement process for the imaging data when the imaging data is photographed by a bayer array imaging element having the optical low-pass filter, as lower than an upper limit of a range for the process parameter of the enlargement process for the imaging data when the imaging data is photographed by an imaging element having a non-bayer array of color filters by which moiré is suppressed without the optical low pass filter.

* * * * *